United States Patent
Glover et al.

(10) Patent No.: US 10,747,838 B2
(45) Date of Patent: Aug. 18, 2020

(54) GEO-FENCE PRE-CACHING SYSTEMS AND METHODS FOR PROVIDING LOCATION-VARIANT RESULTS

(71) Applicant: Samsung Electronics Co., Ltd., Suwon-si, Gyeonggi-do (KR)

(72) Inventors: Eric Glover, Palo Alto, CA (US); Jennifer Myers, Sunnyvale, CA (US); Nicolas Tarleton, Berkeley, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 765 days.

(21) Appl. No.: 15/393,521

(22) Filed: Dec. 29, 2016

(65) Prior Publication Data

US 2017/0192981 A1 Jul. 6, 2017

Related U.S. Application Data

(60) Provisional application No. 62/274,104, filed on Dec. 31, 2015.

(51) Int. Cl.
| | |
|---|---|
| *G06F 16/9537* | (2019.01) |
| *H04L 29/08* | (2006.01) |
| *G06F 16/957* | (2019.01) |
| *G06F 16/2453* | (2019.01) |
| *G06F 16/2455* | (2019.01) |

(52) U.S. Cl.
CPC .... *G06F 16/9537* (2019.01); *G06F 16/24539* (2019.01); *G06F 16/24552* (2019.01); *G06F 16/9574* (2019.01); *H04L 67/289* (2013.01); *H04L 67/2842* (2013.01); *H04L 67/2847* (2013.01); *H04L 67/2852* (2013.01)

(58) Field of Classification Search
CPC .......... G06F 16/9537; G06F 16/24552; G06F 16/24539; G06F 16/9574; H04L 16/9537; H04L 16/24552; H04L 16/2847
See application file for complete search history.

(56) References Cited

U.S. PATENT DOCUMENTS

| | | | | |
|---|---|---|---|---|
| 5,832,499 A | * | 11/1998 | Gustman | G06F 16/40 707/740 |
| 6,701,143 B1 | * | 3/2004 | Dukach | G08G 1/127 455/414.1 |

(Continued)

*Primary Examiner* — Neveen Abel Jalil
*Assistant Examiner* — Hubert Cheung
(74) *Attorney, Agent, or Firm* — Jefferson IP Law, LLP

(57) ABSTRACT

A method of operating a geo-fence pre-caching system that includes a cache server and caches is provided. The method includes receiving from a user device and at a cache server a query wrapper including a cache identifier and a location of the user device. The cache server is implemented in a cloud-based network. The method includes selecting a cache based on the cache identifier. The method includes mapping the location to a first geographical area and accessing a cache entry of a cache record based on the first geographical area. The cache entry indicates the first geographical area. The method includes, based on content of the cache entry, accessing cache entries corresponding to geographical areas adjacent to the first geographical area. The content of the cache entry links to the cache entries. The method includes retrieving and formatting content included in the cache entries for presentation at the user device.

9 Claims, 19 Drawing Sheets

(56) References Cited

U.S. PATENT DOCUMENTS

| | | | |
|---|---|---|---|
| 2002/0143984 A1* | 10/2002 | Hudson Michel | H04L 67/1095 709/238 |
| 2003/0028819 A1* | 2/2003 | Chiu | G06F 11/2089 714/5.11 |
| 2004/0181598 A1* | 9/2004 | Paya | G06F 16/9574 709/227 |
| 2005/0086299 A1* | 4/2005 | Ansell | G06Q 10/087 709/203 |
| 2012/0220308 A1* | 8/2012 | Ledlie | G01S 5/0236 455/456.1 |
| 2014/0297881 A1* | 10/2014 | Shivadas | H04L 67/2861 709/231 |
| 2015/0046594 A1* | 2/2015 | Newton | G06Q 20/123 709/226 |
| 2015/0242420 A1* | 8/2015 | Glover | G06Q 30/0282 707/724 |
| 2015/0278168 A1* | 10/2015 | Hawa | G06F 16/275 715/205 |
| 2015/0371263 A1* | 12/2015 | Kagan | G06F 16/9535 705/14.54 |
| 2016/0188708 A1* | 6/2016 | Glover | G06F 16/9535 707/722 |
| 2017/0067748 A1* | 3/2017 | Glover | G01C 21/20 |
| 2017/0192982 A1* | 7/2017 | Glover | G06Q 30/0241 |

* cited by examiner

CACHE 534-1

| Area | Cache Content | Link | Cache Time |
|---|---|---|---|
| ... | ... | ... | ... |
| (2,3) | *(SAC) | Y | 7/24/15 7:00 PM |
| (3,3) | *(SAC) | Y | 7/24/15 7:00 PM |
| (2,2) | *(SAC) | Y | 7/24/15 7:07 PM |
| (3,2) | *(SAC) | Y | 7/24/15 7:07 PM |
| ... | ... | ... | ... |

SUB-AREA CACHE 534-2

| Area | Cache Content | Link | Cache Time |
|---|---|---|---|
| (2a,3c) | A | N | 7/24/15 7:01 PM |
| (2a,3b) | B | N | 7/24/15 7:01 PM |
| (2a,3a) | *(2a,3b) | Y | 7/24/15 7:01 PM |
| (2a,4c) | *(2a,3b) | Y | 7/24/15 7:01 PM |
| (2a,4b) | *(2a,3b) | Y | 7/24/15 7:01 PM |
| ... | ... | ... | ... |

FIG. 12

GEO-FENCE PRE-CACHING SYSTEMS AND METHODS FOR PROVIDING LOCATION-VARIANT RESULTS

CROSS-REFERENCE TO RELATED APPLICATIONS

This application claims the benefit of U.S. Provisional Application No. 62/274,104, filed on Dec. 31, 2015. The entire disclosure of the application referenced above is incorporated by reference.

FIELD

The present disclosure relates to caching local content for search results and advertisement results that vary by location.

BACKGROUND

In recent years, use of computers, smartphones, and other Internet-connected devices has grown. Correspondingly, the number of available software applications for such devices has also grown. Today, many diverse native and web software applications can be accessed on different devices, including smartphones, personal computers, automobiles, and televisions. These applications can include business driven applications, games, educational applications, news applications, shopping applications, messaging applications, media streaming applications, social networking applications, and other applications. Furthermore, application developers have developed a large number of applications for each genre and multiple editions for each application.

SUMMARY

A method of operating a geo-fence pre-caching system is provided. The geo-fence pre-caching system includes a cache server and caches. The method includes receiving from a user device at a cache server a query wrapper including a cache identifier and a location of the user device. The cache server is implemented in a cloud-based network. The method further includes: selecting a first cache of the plurality of caches based on the cache identifier; mapping the location of the user device to a first geographical area; accessing a first cache entry of a first cache record based on the first geographical area, where the first cache entry indicates the first geographical area; based on content of the first cache entry, accessing one or more cache entries in the first cache corresponding to geographical areas adjacent to the first geographical area, where the one or more cache entries do not include the first cache entry, and where the content of the first cache entry links to the one or more cache entries; retrieving content included in the one or more cache entries; formatting the content included in the one or more cache entries for presentation at the user device; and transmitting the formatted content from the cache server to the user device.

In other features, a method of operating a geo-fence pre-caching system is provided. The geo-fence pre-caching system includes a cache server and caches. The method includes: scanning for a quantized location data set at a first cache of the caches in a cloud-based network and obtaining corresponding record data for a first cache record. The first cache record corresponds to a first geographical area. The method further includes: determining whether the first cache record has an alias; if the first cache record has an alias, setting the record data for the first cache record to match record data of a second cache record, where the second cache record corresponds to a second geographical area; and if the first cache record does not have an alias, determining when the first cache record was last updated and based on a last update time of the first cache record, update the first cache record with updated content, comparing the updated content to content of one or more cache records corresponding to one or more geographical areas adjacent to the first geographical area, marking the first cache record as an alias for the one or more cache records, and updating one or more refresh times of the one or more cache records.

In other features, other methods and systems are provided and include receiving, from a user device, at a server system, a request including a query and a user location. The server system further selects a first cache based at least in part on the query. The server system maps the user device location to a first area specified by a first cache entry of the first cache. Next, the server system accesses the first cache entry and, subsequently, a second cache entry specifying a second area different from the first area. The server system retrieves content specified by the second cache entry, formats the content for presentation at a user device, and transmits the formatted content to the user device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 12 is a data record diagram illustrating example data content of a first and second cache in accordance with an embodiment of the present disclosure.

In the drawings, reference numbers may be reused to identify similar and/or identical elements.

DETAILED DESCRIPTION

Search systems and advertising systems may provide content to users based on a location. For example, search and advertising systems may provide content containing information about shops that are nearby a user's current location or a requested location. Such systems may obtain location-based content (hereinafter "local content") from content providers that provide information about local entities such as restaurants, shops, attractions, events, etc. The systems may format the local content into search results, advertisements, or other content formats (hereinafter "results") for users.

The search system and/or advertising system may leverage multiple content providers in order to provide many types of results for various locations. One approach for leveraging multiple content providers is forwarding user queries to the providers, waiting to receive local content, formatting the local content as results, and finally forwarding results received from the providers to requesting devices. However, this approach may generate significant network traffic, undesirably placing a burden on content services. It may also suffer from latency issues if content providers do not quickly return local content upon request.

In order to provide results quickly and efficiently, search systems and/or advertising systems may maintain caches of local content. Such caches store local content for future provision to users. In order to create a cache of local content, the system retrieves and stores local content for various locations.

Density of local entities varies significantly for different regions (e.g., a rural area vs. a city). Therefore, local content caches should flexibly account for varying densities of local entities. Accordingly, methods and systems for efficiently constructing, updating, and modifying caches of local content are described herein.

Figure 1:
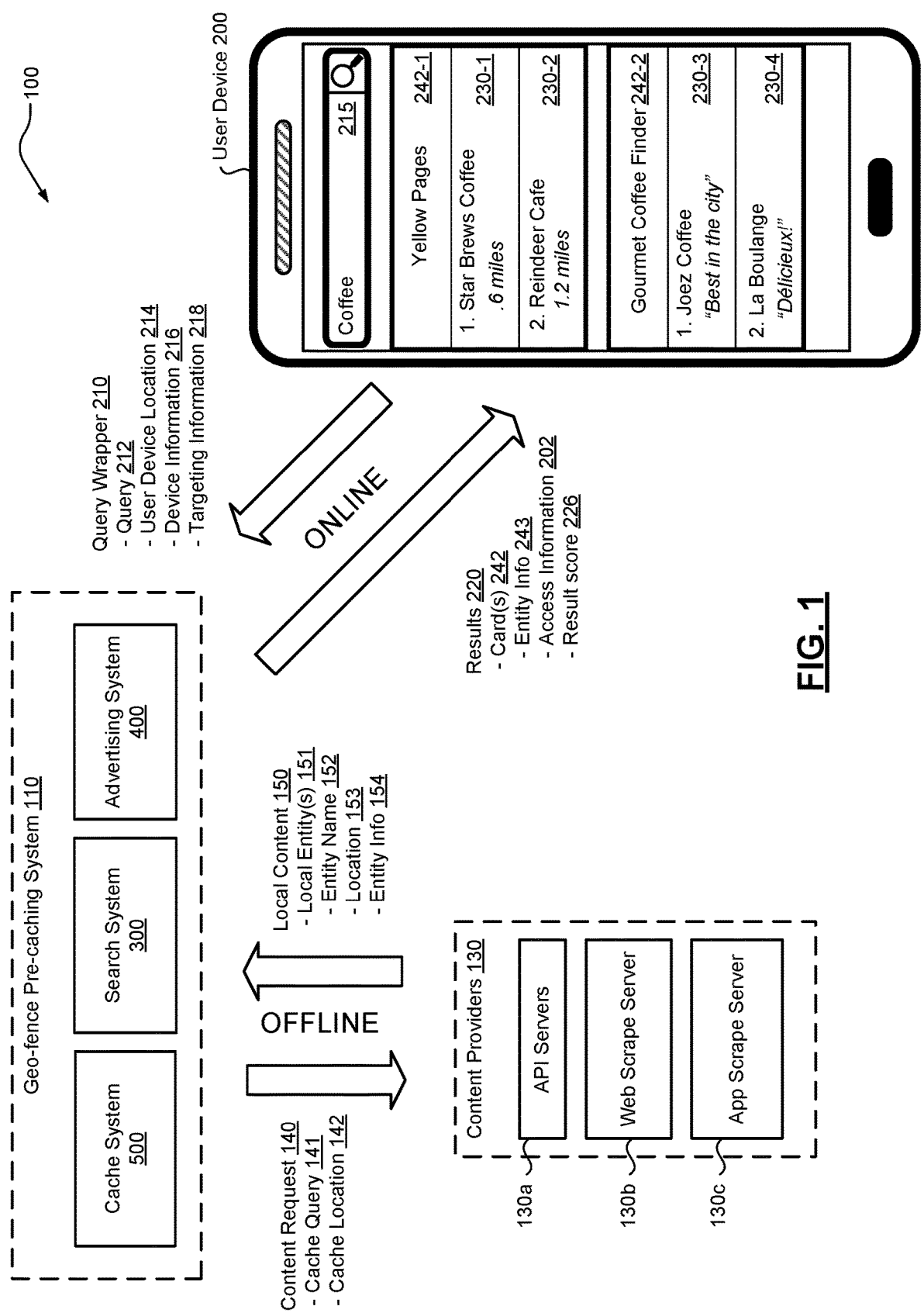
FIG. 1 is a functional block diagram illustrating cloud-based cache access system in accordance with an embodiment of the present disclosure.

FIG. 1 shows an example of a cloud-based cache access system 100 that includes content (or service) providers 130, geo-fence pre-caching system 110 (hereinafter "pre-caching system 110"), and an example user device 200. Data flows between pre-caching system 110 and content providers 130 may take place "offline" (i.e., not in response to a query received from a user device 200), whereas data flows between pre-caching system 110 and user device 200 take place "online" (i.e. in response to a user query). In general, cache system 500 may execute offline processing to populate content caches, whereas search system 300 and/or advertisement 400 in conjunction with cache system 500 may execute online processing in order to retrieve cached content and generate results 220 in response to receiving a query wrapper 210.

In the offline process, pre-caching system 110 sends content requests 140 to content providers 130. The content requests 140 include a cache location 142 and a cache query 141. In some embodiments, content requests 140 are configured as URLs. In response to the content request 140, content providers 130 return local content 150 to the pre-caching system 110. Local content 150 may include information about local entities 151, such as an entity name 152, location 153, and other entity information 154. In one example, cache system 500 sends a content request 140 for a listing of coffee shops nearby a particular location from an application program interface (API) server 130*a* (e.g., a Yellow Pages® API server). In this example, cache system 500 may provide a cache query 141 of "coffee" and a cache location 142 using a format understood by the API server 130*a* (e.g., a URL). In response, the API server 130*a* may provide one or more local entities 151 (e.g., a ranked listing of nearby coffee shops); a ranking of information, such as: comprising names 152 of the entities 151 (i.e. the store names); locations 153 (e.g., geo-coordinates and/or the distance of each store from the provided cache location), and/or other entity information 154 (e.g., ratings, descriptions, and images of the coffee shops). Cache system 500 may store the content in a cache. The content providers 130 may also include a web scrape server 130*b*, which provides content related to websites. In another example, cache system 500 requests information about gourmet coffee shops from an app scrape server (e.g., a server that provides content related to an application). Again, cache system 500 may provide a cache query 141 "coffee" and a cache location 142 using a format understood by the app scrape server 130*c*. The app scrape server 130*c* responds with local content 150 containing information about gourmet coffee shops, which the cache system 500 stores. Each content provider 130 may provide local content 150 in a different format.

In the online process, user device 200 sends a query wrapper 210 to the pre-caching system 110. The query wrapper 210 may specify a query 212, a user device location 214, and optionally device information 216 (e.g., an operating system of the device). Depending on the embodiment, the user device 200 may communicate with a search system 300 or an advertising system 400. In advertising embodiments, the query wrapper 210 may further contain ad targeting information 218. In response, the search system 300 and/or advertising system 400 may select content for provisioning to the user. The search system 300 and/or advertising system 400 may request the selected content from the cache system 500, which retrieves the content from its cache. The search system 300 and/or advertising system 400 formats the content (e.g., organize it using standard templates) before sending the content as results 220 to the user device 200.

At the user device 200, a user may view and interact with results 220. The results 220 may be displayed as one or more result cards 242. A result card may include one or more local entities 230. The user device 200 may display information about local entities 230 including entity name, entity location, and/or other entity information (e.g. images, descriptions, etc.). Selecting a card 242 may cause the user device to access an application or webpage associated with the card 242. For example, a user that selects a "Gourmet Coffee Finder" result card 242 may cause the user device 200 to open a "Gourmet Coffee Finder" application to an application state for finding coffee nearby the user.

Figure 2:
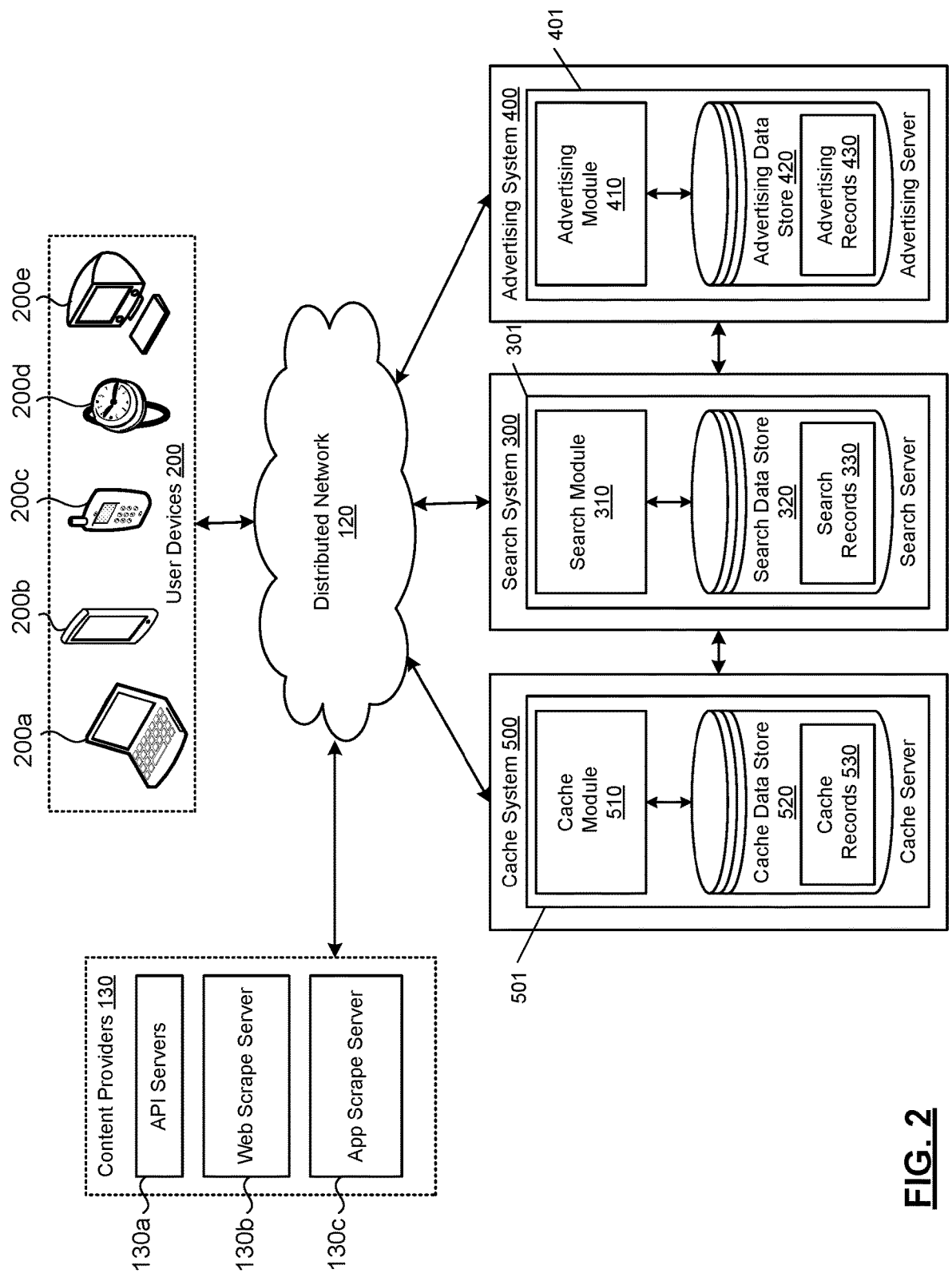
FIG. 2 is a functional block diagram illustrating connections between components of the cloud-based cache access system of FIG. 1.

FIG. 2 provides a functional block diagram of the system. The pre-caching system 110 may be a distributed system (e.g., cloud environment) having scalable/elastic computing resources and/or storage resources. In some embodiments, the search system 300, advertising system 400, and cache system 500 may be part of a single pre-caching system 110. However, in other embodiments, the systems 300, 400, 500 may be separate as illustrated. The user device 200 and/or the pre-caching system 110 may execute a search system 300, an advertising system 400, and a cache system 500 and receive data from one or more content providers 130. In some implementations, the pre-caching system 110 communicates with one or more user devices 200 and the content provider(s) 130 via the distributed network 120. The distributed network 120 may include various types of networks, such as a local area network (LAN), wide area network (WAN), and/or the Internet.

As illustrated by FIG. 2, cache system 500 includes a cache server 501 that includes a cache module 510 and cache data store (or one or more caches) 520. Cache data store 520 includes multiple cache records 530. Search system 300 includes a search server 301 that includes a search module 310 and search data store (or one or more search memories) 320 containing search records 330. Search module 310 may locate one or more search records 330 that relate to a received query wrapper 210. Each of the search records 330 may reference a cache record 530 so that content related to a search record can be retrieved from cache data store 520. Similarly, the advertising system 400 includes an advertising server 401 that includes an advertising module 410 and advertising data store (or one or more advertising memories) 420 containing advertising records 430. The advertising module 410 may locate one or more advertising records 430 that relate to a received advertising query 210. Each of the advertising records 430 may reference a cache record 530, such that content related to an advertising record can be retrieved from the cache data store 520. Operations of the search system 300 and advertising system 400 are described in detail below.

Figure 3:
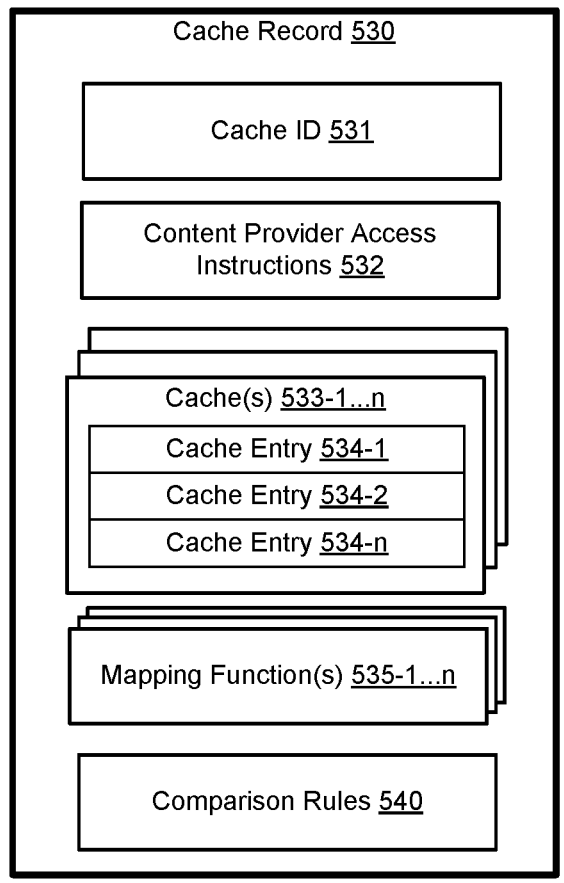
FIG. 3 is an example of a data record diagram including an example cache record in accordance with an embodiment of the present disclosure.

FIG. 3 is a data record diagram illustrating a cache record 530. The cache data store 520 maintains cache records 530. The cache record 530 includes a cache identifier 531 for uniquely identifying the cache record. In some embodiments, the cache identifier 531 may be a number (e.g., an integer) or string. In one embodiment, the cache identifier 531 is a string indicating the content provider and entity type associated with the cache record 530. For example, a cache identifier 531 for a cache record 530 corresponding to the first result 220 of FIG. 1 may be "Yellow Pages-Coffee." Similarly, a cache identifier 531 for a cache record 530 corresponding to the second result may be "Gourmet Coffee Finder-Coffee".

Each of the cache records 530 may correspond to a different content provider and entity type. An entity type may be a particular type of establishment (e.g., restaurants), a particular business (e.g., Star Brews locations), a type of landmark (e.g., fishing spots), or other type of location-based entity. The cache module 510 maintains multiple cache records 530 in order to cache content for different types of local entities and different content providers 130.

The cache record 530 further includes content provider access instructions 532. The access instructions 532 may specify how to access a content provider 130 in order to retrieve local content 150 for cache 533. For example, different content providers 130 may use different URL schema to provide access to local content 150. Accordingly, access instructions 532 may store a URL template and instructions for populating the URL template with a location value in order to access local content 150 for a particular location. In this example, the content request 140 may be formatted as a URL containing cache query 141 and include location values 142. In other examples, the content providers 130 may use other protocols for communication and access instructions 532 may be modified accordingly.

Cache record 530 further contains (or links to) cache(s) 533-1 ... n, which store the content retrieved from content providers 130. A cache 533 contains multiple cache entries 534. Each cache entry 534 stores content of a certain entity type corresponding to a particular geographical area. Geographical areas may be defined using a grid that divides a region into several areas.

Figure 4:
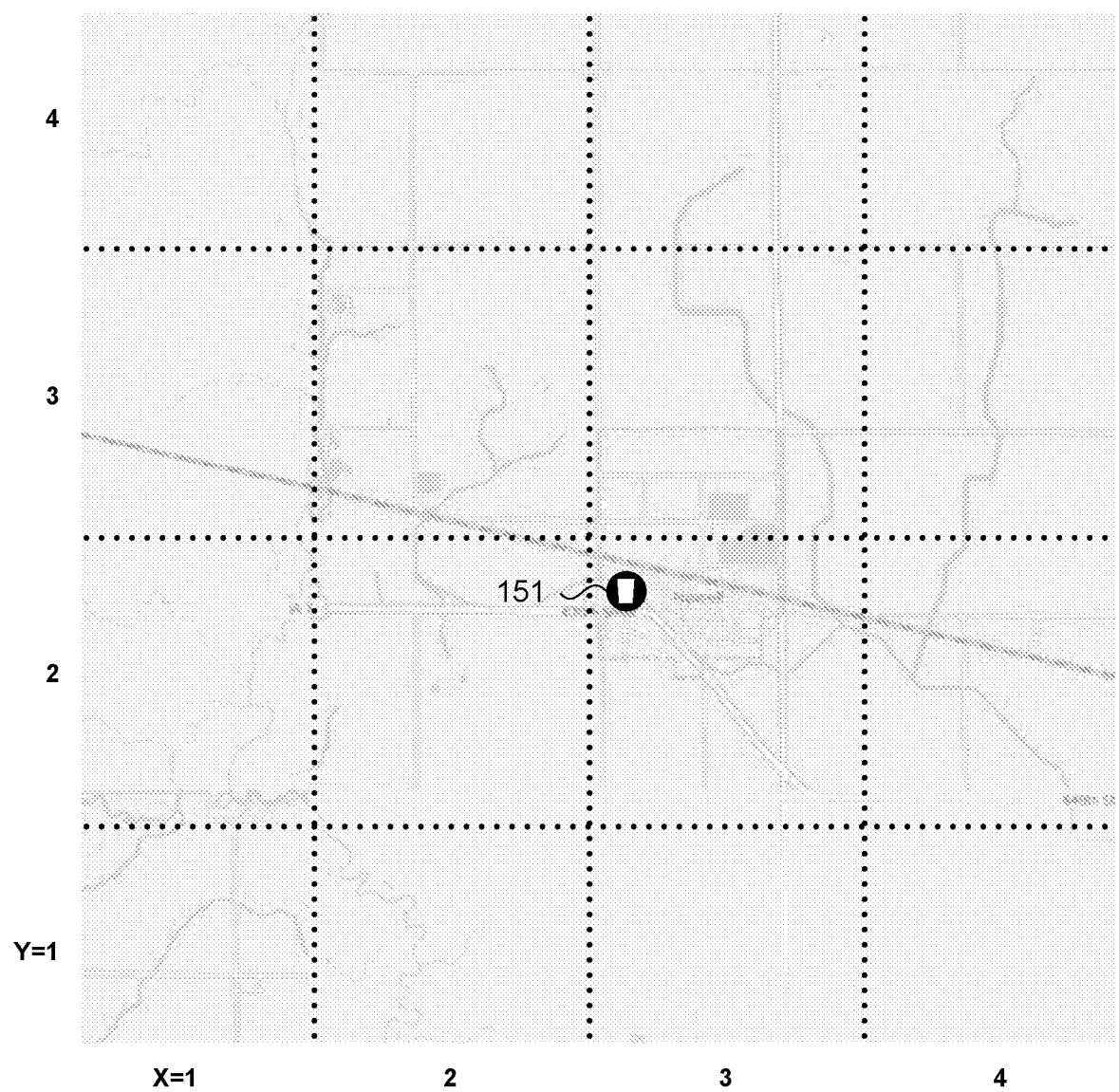
FIG. 4 is a map illustrating a rural region containing few local entities for a given content provider.

FIG. 4 illustrates a map overlaid with dotted lines delimiting areas in a grid. For reference, the grid areas are described using (x, y) coordinates. As an example, the area at the top left of FIG. 4 is referred to as area (1, 4). The map is further overlaid with an icon representing a local entity 151 that may be obtained from a particular content provider 130 (in this example, a content provider with information about coffee shops). The illustrated region of the map is a sparse region along highway IA-7 containing only a single local entity 151.

Each area of the grid corresponds to a cache entry 534. A cache 533 is indexed by area, with one set of local content 150 stored for each area. The local content 150 includes one or more local entities 151. The local content 150 may, for example, include a list of all local entities 151 within a certain distance of a location. In other examples, the local content 150 may include a list of the closest N local entities 151 to a particular location (e.g., the closest 5 local entities). Some content providers 130 may provide local content 150 including a list of the closest N local entities 151 within a particular maximum distance. Other content providers 130 may provide local content 150 including a list of the closest N local entities 151 by driving time. Still others may provide a list of entities 151 within a certain distance in order of quality or rating. As will be appreciated, local content 150 can be any set of local entities 151 defined by one or more conditions, where the set varies by location.

Although FIG. 4 illustrates a 4 area×4 area portion of a grid, in embodiments the grid may be any arbitrary size. The grid may be sized to include areas of a country, city, state, continent, or any other geographical region. For example, local content 150 may be obtained from a content provider that lists all the businesses in the United States. Accordingly, a grid may cover all (or selected portions) of any geographical region.

FIG. 4 illustrates Cartesian coordinates for identifying areas in the grid. However, any type of coordinate system can be used to label and/or define grid areas. Grid areas may be defined by GPS latitude/longitude pairs. For example, area (1, 1) of FIG. 4 may be defined by GPS coordinates (46.63° N, 95.20° W), such that a location with GPS coordinates (46.63123° N, 95.20456° W) will fall within area (1, 1). Similarly, area (1, 2) may be defined by GPS coordinates (46.64° N, 95.20° W). Although FIG. 4 illustrates a grid containing square areas, in other embodiments, areas may be defined by other shapes, such as rectangles, hexagons, etc.

In an offline process, the cache system 500 may send content requests 140 to content providers 130 in order to populate the cache 533 with local content 150. Cache module 510 may generate multiple content requests 140 for each cache entry 534 to be populated with local content 150. Content request 140 includes a cache location 142 corresponding to the area of respective cache entry 534. For each cache entry 534 corresponding to a grid area, the cache location 142 included in the content request 140 may be selected as the center point of the area.

Local content for sparse or rural regions such as the region of FIG. 4 may not vary between adjacent grid areas due to the low density of local entities 151. For example, cache entry for area (1, 1) may store a list of the local entities 151 within 10 miles of the center of area (1, 1). Similarly, cache entry for area (1, 2) may store a list of the local entities 151 within 10 miles of the center of area (1, 2). In the example of FIG. 4, there is only one local entity 151 within 10 miles of each of the illustrated areas. Accordingly, the local content retrieved for each respective cache entry 534 will be the same. In order to avoid duplication of local content 150 stored in the cache, cache module 510 may create links between cache entries 534 having the same content.

Figure 5:
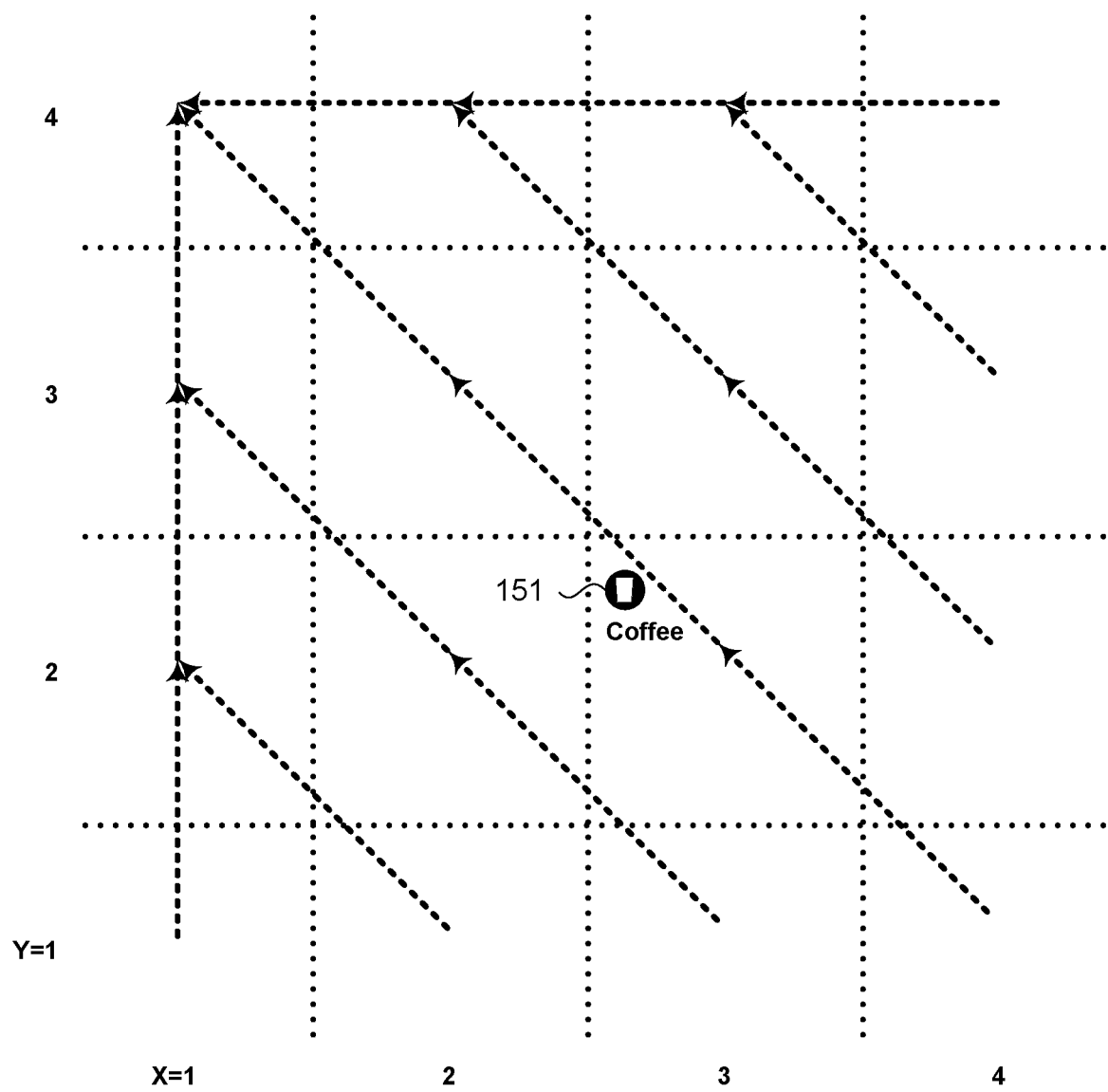
FIG. 5 is a diagram illustrating a set of links generated between cache entries corresponding to areas of a grid in accordance with an embodiment of the present disclosure.

FIG. 5 illustrates the grid of FIG. 4 with additional dashed arrows representing links between areas of the grid. In the illustrated example, all of the cache entries 534 are linked to the cache entry 534 corresponding to area (1, 4), indicating that each cache entry 534 has the same cache content as the cache entry 534 for area (1, 4). As shown in FIG. 5, when cache module 510 creates links, one cache entry 534 may be linked to several cache entries 534 for adjacent areas. In the illustrated example, the cache module 510 compares the cache content for the area (1, 4) to the cache content for all the neighboring areas in order to determine that each area has the same cache content values before creating the links.

For further defined structure of the modules of FIGS. 1-2 and 18-19 see below provided methods of FIGS. 6, 10, 13, and 15-17 and below provided definition for the term "module". The systems disclosed herein may be operated using numerous methods, example methods are illustrated in FIGS. 6, 10, 13, and 15-17. Although the following methods are shown as separate methods, one or more methods and/or operations from separate methods may be combined and performed as a single method.

Figure 6:
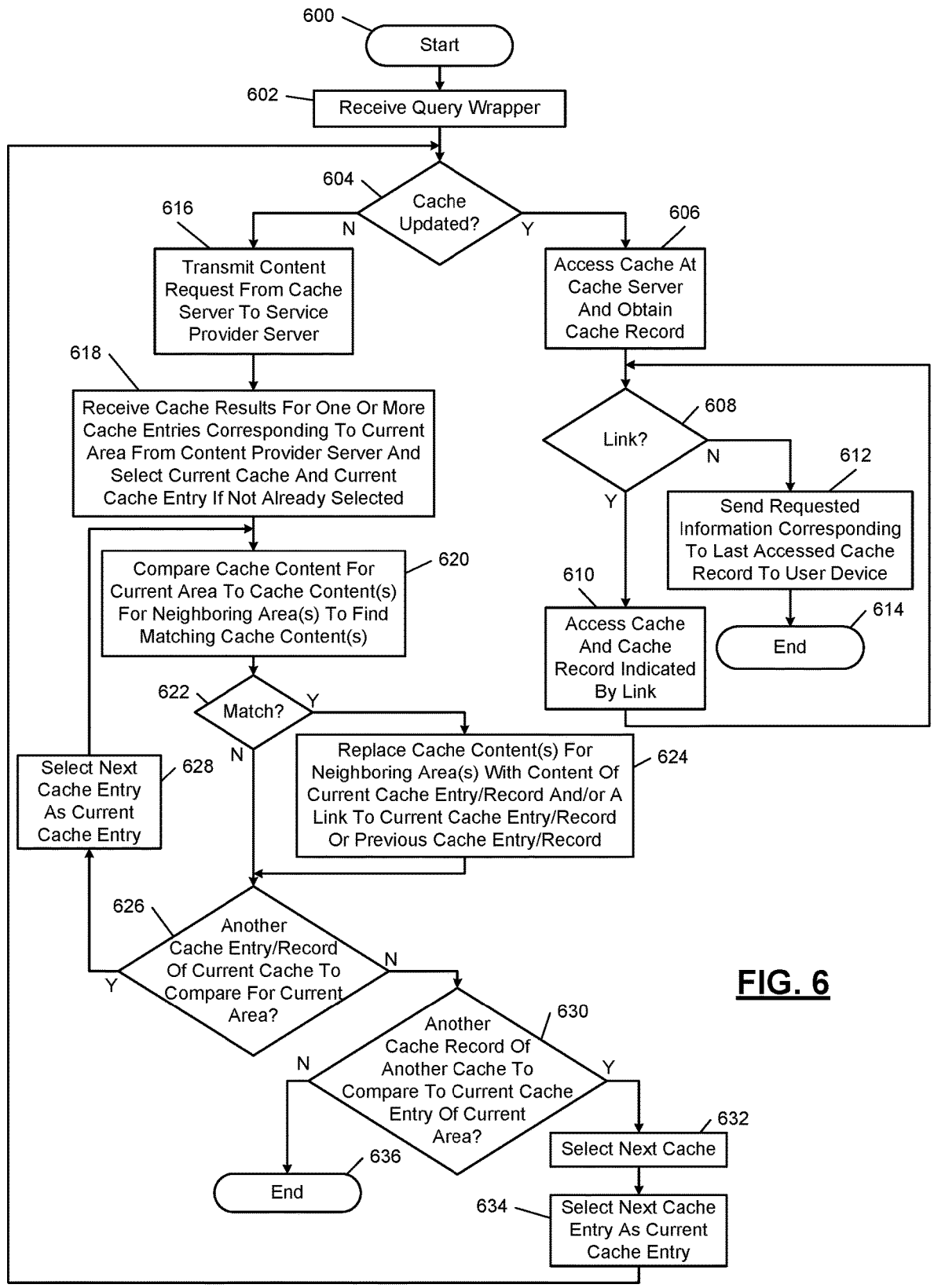
FIG. 6 illustrates a method of creating links between cache entries of a cache.

FIG. 6 illustrates a method for creating links. Although the following operations are primarily described with respect to the implementations of FIGS. 1-2, the operations may be modified to apply to other implementations of the present disclosure. The operations may be iteratively performed. The method may begin at 600. At 602, the cache module 510 may receive a query wrapper as described above from a user device. At 604, the cache module 510 may determine whether a cache of the cache server 501 corresponding to the query wrapper has been updated within the last predetermined period of time. If the cache has been updated, operation 606 may be performed; otherwise operation 616 may be performed. The query wrapper may indicate an ID of the cache, the user device location, and/or identify a current cache record in the cache for a current area. The cache module 510 may then determine whether the cache and/or corresponding cache records have been updated within the last predetermined period based on the cache ID, the user device location, and/or IDs (or addresses) of the current cache record.

At 606, the cache module 510 accesses the cache at cache server and obtains a current cache record (and/or current cache entry) corresponding to the query and location of the user device indicated in the received query wrapper. At 608, the cache module 510 determines whether the current cache record/entry has a link to a second cache record/entry. The second cache record/entry may be associated with a second area neighboring (or adjacent to) the current area. The second area may be an area that is not adjacent to the current area. If there is a link, operation 610 is performed, otherwise operation 612 is performed. At 610, the cache module 510 accesses the current cache or a second cache corresponding to the second cache record/entry indicated by the link. At this point, the second cache record/entry becomes the current cache record/entry. Operation 608 may be performed subsequent to operation 610. At 612, information requested by the user via the query wrapper is transmitted to the user device. Requested information included in the current cache record/entry is transmitted to the user device and then displayed at the user device. The method may end at 614 subsequent to performing operation 612.

At 616, the cache module 510 initiates offline communications with one or more service provider servers and transmits one or more content requests to the service provider server(s). The content requests are sent to update cache records/entries in the current cache and/or associated with the information requested in the query wrapper.

At 618, the cache module 510 retrieves and caches local content 150 for one or more cache entries 534 from content provider(s) 130. This may occur over several iterations of operations 604, 616, 618, 620, 622, 624, 626, 628, 630, 632, and/or 634. If not already selected, the current cache and current cache entry may be selected. The current cache may initially be the cache indicated in the query wrapper and/or identified by the cache module 510 based on the query wrapper.

In order to retrieve local content 150 for different areas, cache module 510 makes multiple requests 140 to content provider(s) 130. Each request 140 includes a cache location 142 corresponding to one of the areas specified by respective cache entries 534. For example, cache module 510 may request local content 150 for a cache location 142 corresponding to the center of each area. In response to the content request(s) 140, content provider 130 provides local content 150. The data of local content 150 may optionally be formatted before storing in a given cache area as cache content 534b. For example, formatting may include selectively discarding data, translating data into different formats, and the like. When cache content 534b is stored, a cache time 534d may be recorded in cache entry 534.

At 620, the cache module 510 compares the recently cached content 534b for the current cache entry 534 (or current cache record) to the recently cached content 534b (or recently cached record) for one or more neighboring areas. Neighboring areas may refer to areas that are adjacent to the current area in the grid. For example, with reference to FIG. 4, neighboring areas of area (2, 2) may include areas (3, 3), (3, 2), (3, 1), (2, 1), (1, 1), (1, 2), (1, 3), and (2, 3). In this example, neighboring areas include all areas that are vertically, horizontally, or diagonally adjacent to the current area. In some embodiments, the area of the previously current cache entry 534 may be omitted from the set of neighboring areas in operation 620. For example, the cache entry 534 for area (1, 4) may be selected as the current area in a first iteration of the method. In the next iteration of the method, the cache entry 534 for area (2, 4) may be selected as the current area. For the second iteration, area (1, 4) may be omitted from the set of neighboring areas at operation 620. Additionally or alternatively, areas for cache entries 534 that were recently linked to another cache entry 534 (e.g., within a threshold time from the current time) may be omitted from the set of neighboring areas in operation 620. For example, in a first iteration of the method, cache entry for area (2, 4) may be linked to cache entry for area (1, 4). In a third iteration of the method, cache entry 534 for area (3, 4) may be selected as the current cache entry 534. In the third iteration, area (2, 4) may be omitted from the set of neighboring areas.

Matching cache contents 534b may refer to cache contents 534b that are exact and/or partial matches. Comparison operation 620 may include comparing the content and/or metadata of cache content 534b. Cache content 534b may include images, video, audio, multimedia, text, and/or other content along with associated metadata. Finding matches may include using comparison rules 540 to compare content and/or metadata between the cache contents 534b. A match may be indicated by a percentage match between cache contents 534b. For example, if cache contents 534b contain multiple image and text fields, a match may be indicated when at least 70% of the fields match.

Comparison rules 540 may vary based on the content provider(s) 130 from which the local contents were obtained. For example, some of the content providers 130 may embed random advertisements into local content 150, which may be stored in cache content 534b. Provider-specific rules 540 may be applied to decide which information (e.g., which fields of the cache content) to compare. In this example, a rule 540 may specify that an advertisement should be ignored for purposes of the comparison.

In another example, cache contents 534b may indicate the distance to a local entity from a location 142 provided to the content providers 130 in the retrieval operation 618. A comparison rule 540 may specify that a distance field should be ignored for purposes of finding a match. For example, a result for area (1, 4) of FIG. 4 may include the local entity 151 and indicate a distance of 5 miles in a location 153 of the local content 150. The cache content 534b for area (2, 4) may include the same local entity 151 with a location 153 of 4 miles. In this case, a rule may indicate that the location 153 should be ignored for comparing the results (i.e., because the location 153 is relative). In some cases, thresholds for comparison rules 540 may be adjusted higher or lower for different content providers 130.

In some examples, cache content 534b may include an ordered collection of local entities (e.g., a ranked list). Comparison rules 540 may indicate whether cache contents 534b including the same local entities, but in different order, indicate a match or not. For example, cache content 534b for a first cache entry 534 may include a list ranked: 1) Star Brews coffee, 2) Reindeer Cafe, 3) Tom's Bakery. Cache content 534b for a second cache entry 534 with an adjacent area may include a list ranked: 1) Reindeer Cafe, 2) Star Brews coffee, 3) Tom's Bakery. In some embodiments, the two cache contents 534b are matches because the two cache contents contain the same local entities; in other embodiments, cache contents may not be matches because the cache contents include different rankings.

In some cases, the cache content 534b for the current area may be a link to another area. In this case, the cache content 534b at the linked area may be used as the cache content 534b for the current area in comparison operation 620. If the linked cache content 534b is also a link, the chain of links may be followed until finding a non-link cache content 534b, which may be used as the cache content 534b for the current area in comparison operation 620.

At 622, if there is a match (full or partial match) then operation 624 may be performed; otherwise operation 626 may be performed.

At 624, the cache module 510 replaces cache contents for neighboring areas with content and/or a link to a current cache entry of the current cache record or a link to a previous cache entry of a previously linked cache record. The link may refer to the current cache record and/or the current cache or a previous cache record and corresponding cache. The previously linked cache record may not correspond to an area adjacent to the area of the current cache record. The previously linked cache record may be in a chain of linked cache records. The cache content 534b for neighboring areas that match the cache content 534b for the current area may be replaced with links to the current cache entry 534. In some cases, when the cache content 534b for the current area is a link to a second area, the matching cache content 534b for a neighboring area may be replaced with a link to the second area. In other words, the method may avoid creating chains of links. This approach has the benefit of reducing cache lookups by linking directly to the area containing non-link cache content 534b. In other cases, the method may create chains of links, as illustrated by FIG. 5. This approach may be more robust to data updates (e.g., when content provider adds a new local entity, a cache 533 containing link chains may be easier to reconfigure). As the method iterates through the areas of the current cache, cache contents 534b that match other cache contents 534b will be replaced by links.

At 626, the cache module 510 may determine whether there is another cache entry/record of the current cache to compare for the current area. If there is another cache entry/record to compare, operation 628 is performed, otherwise operation 630 is performed. At 628, the cache module 510 selects the next cache entry 534 and/or cache record as the current cache entry 534 and/or cache record. In the first iteration through the method, the current cache entry 534 may be the first cache entry 534 in the cache 533. In the second iteration, the current cache entry 534 may be the second cache entry 534, etc. In some embodiments, cache module 510 does not iterate through all cache entries 534 each time it executes this method. For example, it may skip certain cache entries 534, select them randomly, etc. In other embodiments, cache module 510 may not select cache entries 534 that have already been linked to another area, or cache entries 534 that have recently been linked to another area (e.g., within a threshold time) as a next cache entry 534 in operation 604.

At 630, the cache module 510 may determine whether there is another cache entry and/or cache record of another cache for another area to compare to the current cache entry and/or cache record of the current area. If there is another cache entry and/or cache record to be compared for another area operation 632 is performed, otherwise the method may end at 636. At 632, the cache module 510 selects a next cache to be the current cache. At 634, the cache module 510 selects the next cache entry as the current cache entry similar to operation 628. The method may end after iterating over all available cache entries 534 of a current cache record, of a current cache, and/or multiple caches. This may include areas and sub-areas.

The above-described operations of FIG. 6 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

In operation, the method of FIG. 6 may create links as illustrated by FIG. 5. In this example, a cache entry 534 for the first area (1, 4) may be selected as the current cache entry 534 in operation 602. Next, in operation 604, the cache content 534b for area (1, 4) may be compared to the cache contents 534b for each of areas (2, 4), (2, 3), and (1, 3). In this case, each of the cache contents 534b indicates the same local coffee shop as the only local entity. Accordingly, each of the cache contents 534b for the neighboring areas match the cache contents for the current area, and each can be replaced with links in operation 608. The method then loops back to operation 604 and selects area (2, 4) as the current area. In operation 606, cache contents 534b for area (2, 4) may be compared to cache contents 534b for areas (3, 4) and (3, 3). Areas (1, 4) and (1, 3) may be omitted from this operation because links were recently created for those areas, as discussed above. Because the cache content 534b for area (2, 4) is a link, the link may be followed to retrieve the cache content 534b from area (1, 4) and compare it to the cache content 534b of areas (3, 4) and (3, 3). Again, since the local coffee shop is the only local entity, a match is indicated and links are created for both neighboring areas. As discussed above, the links may be directed to area (2, 4) or alternatively, to the end of the link chain at area (1, 4). The process may continue in this manner until all areas of the grid are linked (directly or indirectly) to area (1, 4).

Cache module 510 may execute the method of FIG. 6 periodically for each cache record 530 to maintain the cache(s) 533 in an updated state. In some embodiments, the update frequency may depend on the content provider 130 and/or entity type associated with each cache record 530. For example, a cache 533 storing local events data may be refreshed more frequently than a cache, which stores local business information.

Figure 7A:
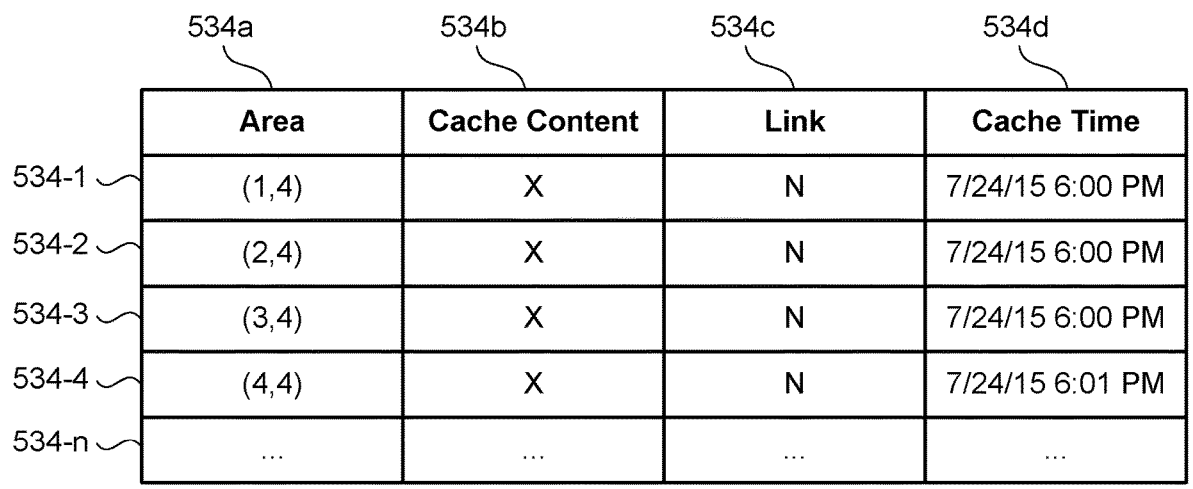
FIGS. 7A-B are data record diagrams illustrating example data content of a cache before and after executing a link creation process in accordance with an embodiment of the present disclosure.
Figure 7B:
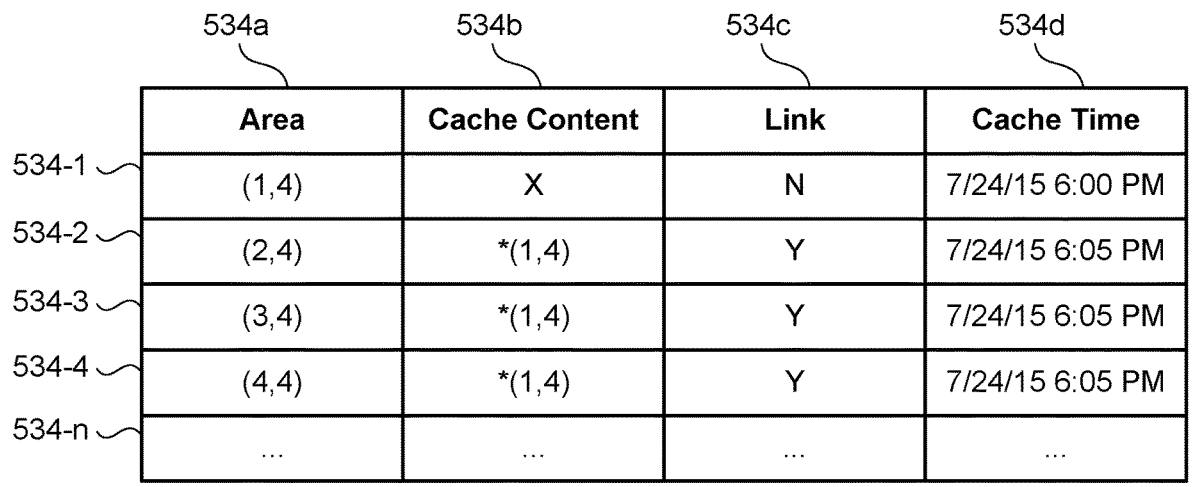

FIG. 7A-B illustrate the cache 533 before and after creating links respectively. The cache stores several cache entries 534, each cache entry includes an area 534a field, a cache content 534b field, and optional link 534c and cache time 534d fields. The area field 534a contains an area value, which may be coordinates or some other means of identifying a geographical area. Although the figure shows coordinates matching coordinates illustrated in FIG. 4, in some embodiments the area value of the cache may store GPS coordinates or other area definitions.

In online operation, cache system 500 may use a user device location 214 to retrieve cache content 534b that maps to a corresponding area. For example, a user travelling east along Highway 7 may pass through areas (1, 2), (2, 2), (3, 2), and (4, 2), in succession. When user device 200 sends a query wrapper 210, the query wrapper 210 may include the user device location 214 specified as GPS coordinates. The cache module 510 may access the cache 533 to find the cache entry 534 corresponding to the user device location 214; whereupon the cache content 534b from that cache entry 534 may be retrieved for the user. For example, a user device 200 located within area (2, 2) may receive the cache content 534b for that area.

The cache module 510 receives a user device location 214 and maps the user device location 214 to an area 534a to find a cache entry 534 using a mapping function 535 of a cache record 530. The mapping function 535 maps a location to a particular area of the cache. For example, the mapping function 535 may indicate that a user device location 514 with coordinates of (46.63123° N, 95.20456° W) corresponds to an area value of (46.63° N, 95.20° W). In this case, the mapping function 535 may operate by dropping any digits after the hundredths place of the GPS coordinates. In other embodiments, more complex mapping functions 535 may be used.

The cache content 534b field includes cache content 534b or a link. In some examples, the cache content 534b may be formatted as a list (or some other set) of local entities 151. The local contents 150 may be obtained in different formats from different content providers 130 and stored in the cache 533 as cache contents 534b. The local contents 150 may be formatted before being stored as the cache contents 534b.

The link field 534c may indicate whether the cache content field 534b contains a link or not. The link field 534c may contain a Boolean value, an integer, or some other data type. The link field 534c may be used by the cache module 510 in order to decide how the cache contents 534b should be handled. When the link field 534c indicates that the cache content field 534b includes a link, the cache module 510 may follow the link to the linked cache entry 534 and retrieve the cache content 534b at the linked cache entry 534. When the link field 534c indicates that cache content 534b does not include a link, the cache module 510 may retrieve the cache content 534b. In some embodiments, the cache module 510 may detect whether a value of the cache content 534b is formatted as a link or not, in which case the link field 534c may be omitted.

The cache time 534d indicates the time at which the cache content 534b was stored. If the cache content 534b is not a link, the cache time 534d may indicate the time at which the local content 150 was retrieved from a content provider and cached. If the result is a link, the cache time 534d may indicate the time at which the link was created.

As shown in FIG. 7A-B, the cache content field 534b may include a link to another cache entry 534. The cache content value "*(1, 4)" for area (2, 4) may indicate that the cache content 534b should be accessed at the cache entry 534 for area (1, 4). Accordingly, when a user device location 214 maps to area (2, 4), the cache module 510 may follow the link to find the cache entry 534 for area (1, 4) and retrieve the cache content 534b.

In some embodiments, when the caching local content 150 is for denser regions, such as cities, a grid may include multiple local entities 151 in each grid area. In this situation, caching only one set of local content per area may be undesirable because, for example, the closest local entity may vary based on a user's location within an individual grid area. Accordingly, the cache module 510 may create caches using sub-grids containing smaller areas for denser regions.

Figure 8:
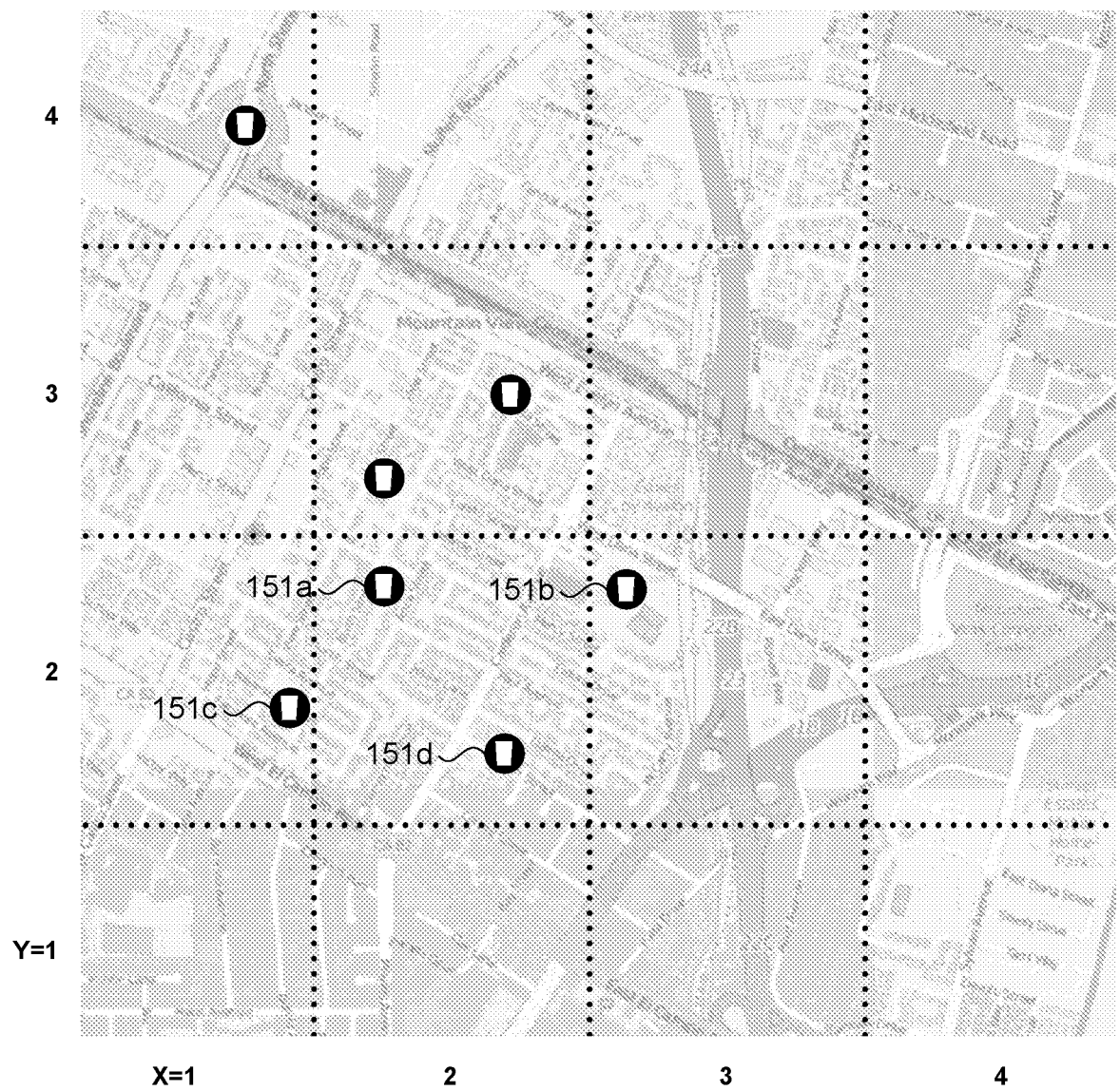
FIG. 8 is a map illustrating an urban region containing several local entities for a given content provider.

FIG. 8 illustrates a grid overlaying a map of a denser region containing several local entities 151. In this example, the local entities 151 again correspond to coffee shops. In denser regions, the grid areas may be too large to accurately provide cached content to users within a particular area. For example, the closest local entity 151 for a user in area (2, 2) of FIG. 8 may be one of local entities 151a, 151b, 151c, or 151d depending on the user device location 214 within the area. Accordingly, a sub-grid could be used for area (2, 2).

Figure 9:
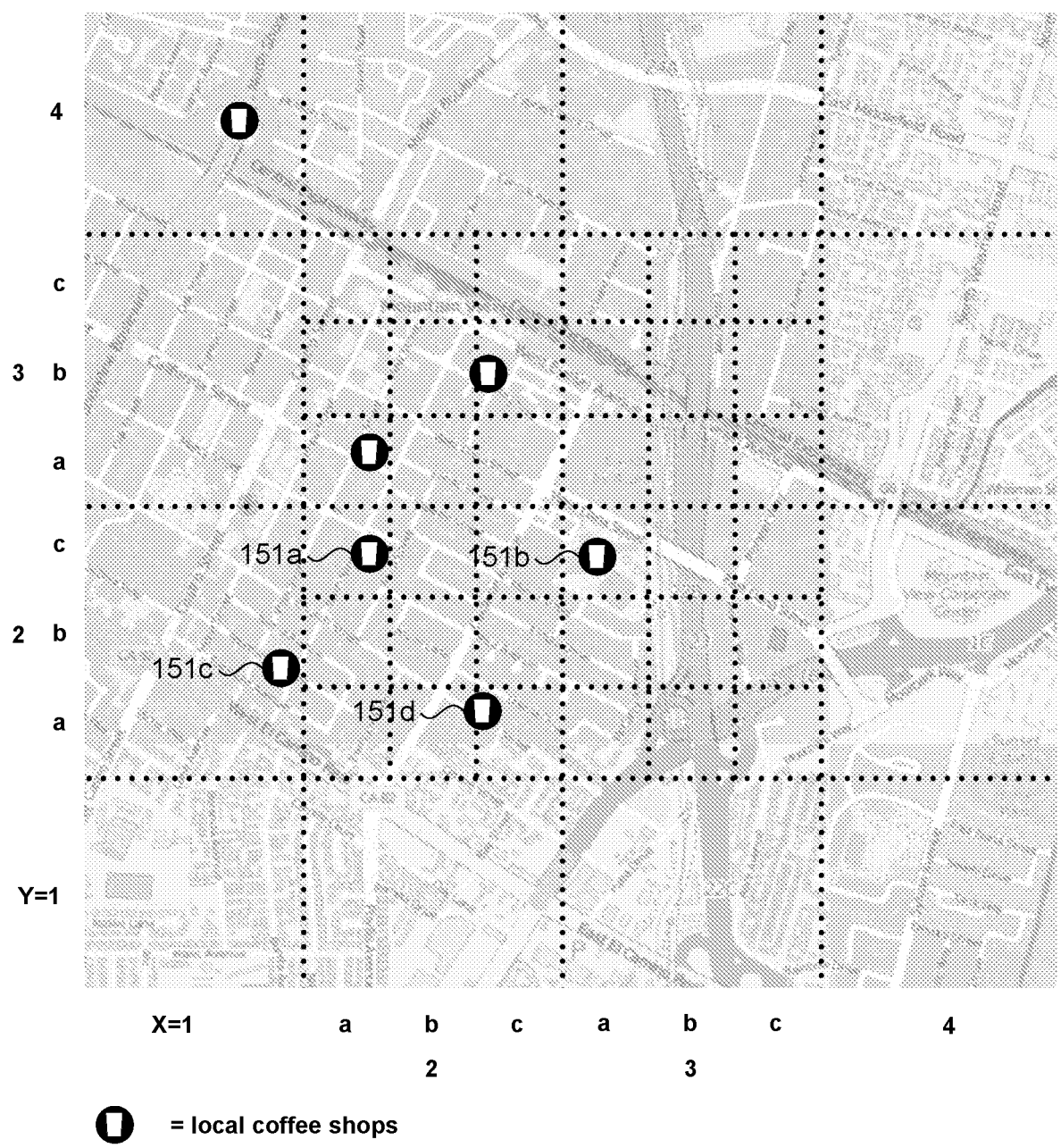
FIG. 9 is a map illustrating an urban region overlaid with two levels of grid 9 for caching local content in accordance with an embodiment of the present disclosure.

FIG. 9 illustrates a grid including several areas, some of which are sub-divided into sub-areas of a sub-grid. In this example, a grid area may be sub-divided into 9 sub-areas of a sub-grid. The cache module 510 may detect which areas should be divided into sub-grid areas and modify caches 533-1 . . . n appropriately according to the method of FIG. 10.

Figure 10:
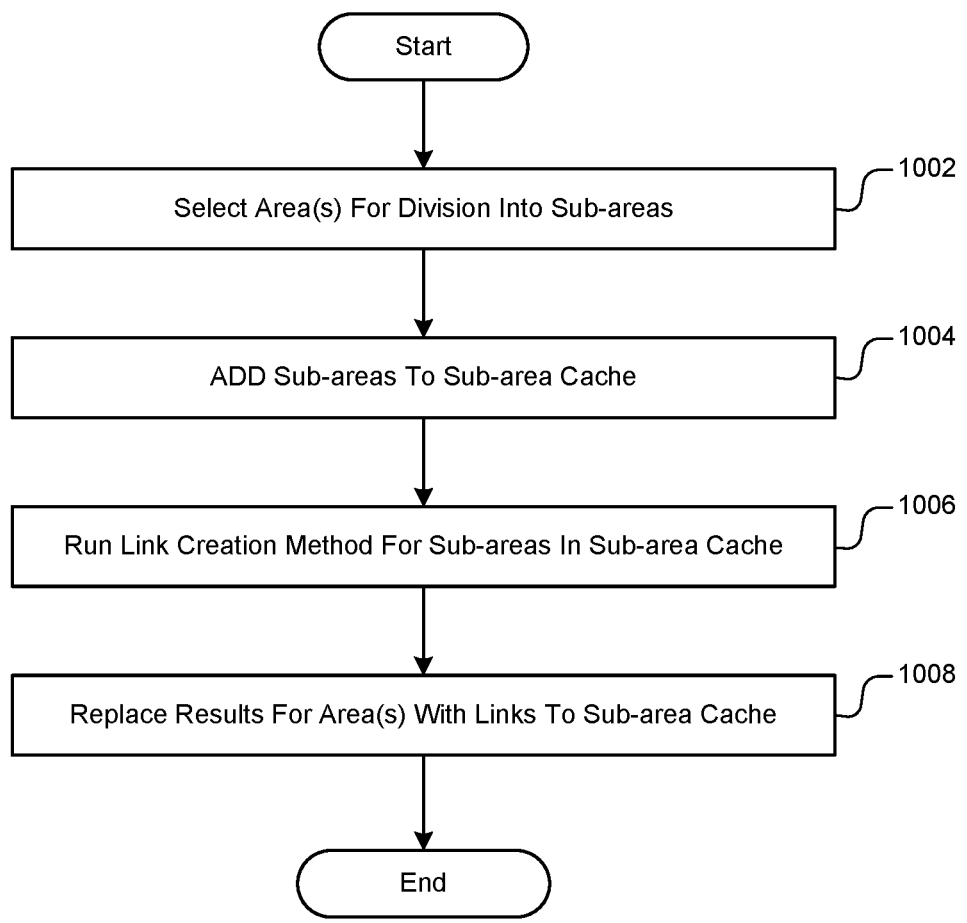
FIG. 10 illustrates a method of creating multiple caches corresponding to urban regions in accordance with an embodiment of the present disclosure.

In operation 1002 of FIG. 10, the method selects one or more areas in a cache (e.g., cache 533-1) that should be divided and added into a sub-cache (e.g., cache 533-2). Areas that are good candidates for division may be near dense clusters of local entities 151. The cache module 510 may detect such areas by detecting that the cache content 534b varies for different locations in the same area. In some embodiments, the cache module 510 may occasionally retrieve the local content for a location within an area from the content provider(s) 130 and compare the local content to the cache content 534b for that area. If the contents do not match (e.g., the contents differ by more than a threshold difference according to comparison rules 540), the cache module 510 may select the area as an area for division. The location used for such a comparison may be a user device location 214 which is stored in a queue for later checking. Such locations may be taken from a queue randomly or in order using an offline process. For example, a user device 200 may send a query wrapper 210 with user device location 214 falling within area (2, 2) of FIG. 8. During the online process, the cache module 510 may fetch the cache content 534b for area (2, 2) and retrieve the cache content 534b for the user device 200. However, the cache module 510 may also store the user device location 214 in a queue. At a later time, local content 150 for the location may be retrieved from content provider(s) 130 and compared to the cache content 534b. In the event of a mismatch, the area (2, 2) may be selected for division. In some cases, the cache module 510 may only select an area for division after detecting multiple mismatches for the same area.

In operation 1004, an area may be divided into several sub-areas, which may be added into a sub-cache (e.g., cache 514-2). If the sub-cache does not already exist in storage, the cache module 510 may create the sub-cache first by allocating a portion of the cache. The cache module 510 creates a new cache entry 534 in sub-cache for each sub-area. For example, if an area is divided into 9 sub-areas, cache module 510 creates 9 cache entries in sub-cache. The cache module 510 may divide multiple areas in a batch. For the example of FIG. 9, four areas may be divided into 36 sub-areas in a batch. The cache module 510 also calculates area values 534a for the sub-areas and adds them into the cache entries 534.

Figure 11:
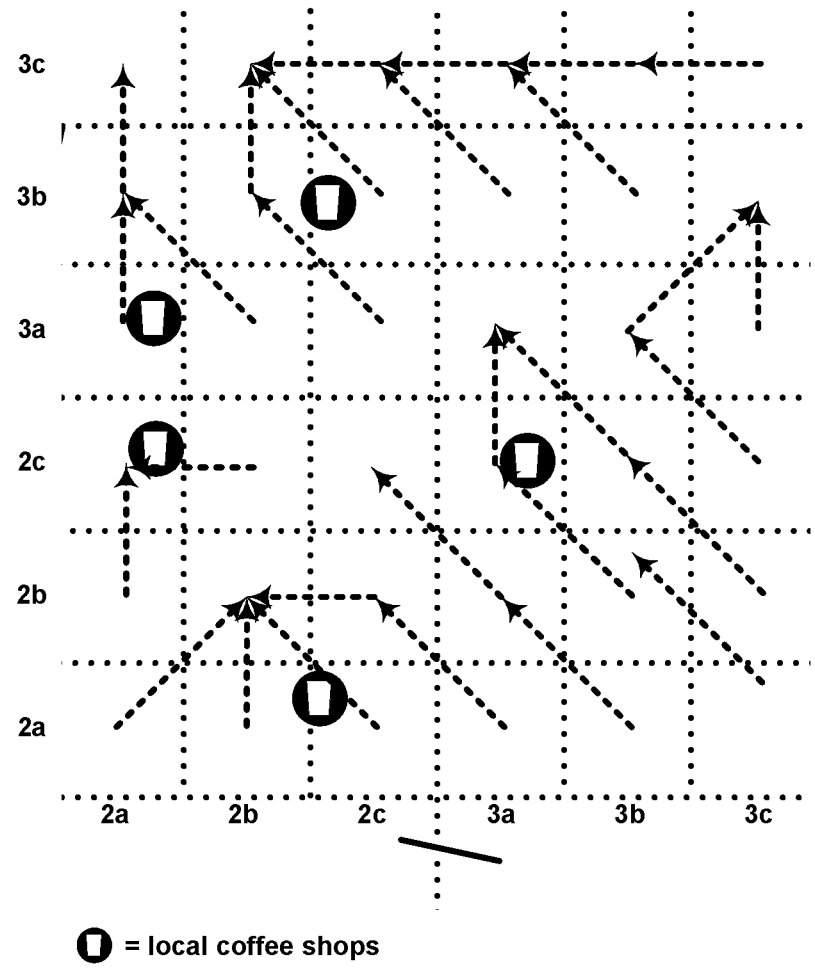
FIG. 11 is a diagram illustrating a set of links generated between cache entries corresponding to areas of a grid in accordance with an embodiment of the present disclosure.

In operation 1006, the cache module 510 may execute the link creation method of FIG. 6 for each of the new cache entries 534 created for the sub-areas. An example of the links created during link creation method is illustrated at FIG. 11. As illustrated, sub-areas may be linked (directly or indirectly) to other sub-areas according to the method of FIG. 6. The cache module 510 replaces the cache content 534b with links based on comparisons between cache contents 534b of sub-areas as previously described.

In operation 1008, the cache module 510 replaces the cache contents 534b for areas that were selected for division in operation 1002 with links to the sub-area cache. A special link value may indicate that cache module 510 should check in sub-area cache for cache content 534b.

The method of FIG. 10 may be repeated for sub-areas of the sub-area cache to create a third level of division. In other words, the cache module 510 may further divide sub-areas into sub-sub-areas, add corresponding cache entries into a sub-sub-area cache (e.g., cache 533-3), and link the divided sub-areas to the sub-sub-area cache. In some embodiments, the cache module 510 may create additional levels of division beyond three. Additionally or alternatively, the cache module 510 may limit the number of levels of divisions in order to limit the number of caches 533-n, which may reduce the cache lookup time (e.g., the cache module 510 may allow only 3 levels of division).

Example contents of the cache 533 and a sub-area cache after executing the method of FIG. 10 are illustrated at FIG. 12. In the example of FIG. 12, cache 514-1 contains four areas that were divided into sub-areas. For each such area, the cache module 510 replaced the cache content 534b of the corresponding cache entry 534 with a pointer to the sub-area cache (which may be indicated by a cache identifier, e.g. "SAC" in this example). Accordingly, when the cache module 510 receives a user device location 214 that maps to one of the illustrated cache entries of cache 533-1, the cache module 510 accesses the corresponding cache entry 534 and checks the cache content 534b, which links the cache module 510 to the sub-area cache. The cache module 510 then finds the cache entry 534 in sub-area cache 533-2 corresponding to the user device location 214.

The sub-area cache 533-2 has the same structure as the cache 533-1. Each of the cache entries 534 contain an area value 534a, cache content value 534b, optional link 534c and cache time 534d values. As before, the sub-area values 534a may be specified by GPS or other coordinates. For example, sub-area (2a, 3c) may correspond to GPS coordinates falling within the ranges (46.6566-46.6599° N, 95.1999-95.1966° W). The cache content field 534b for each cache entry 534 of sub-area cache 533-2 may contain cache content 534b or a link to another cache entry 534. The link value 534c may indicate whether the cache content contains a link or not. The cache time value 534d may indicate how recently the cache entry 534 was updated.

After following the link to the sub-area cache 533-2, the cache module 510 maps the user device location 214 to one of the cache entries 534 in sub-area cache 533-2 based on the corresponding area value 534a using mapping function 535. After mapping the user device location 214 to a cache entry 534, the cache module 510 returns the cache content 534b for that cache entry 534. If the cache content 534b for the cache entry 534 is a link to another cache entry 534, the cache module 510 accesses the linked cache entry 534 and returns the cache content 534b from the linked cache entry 534.

Figure 13:
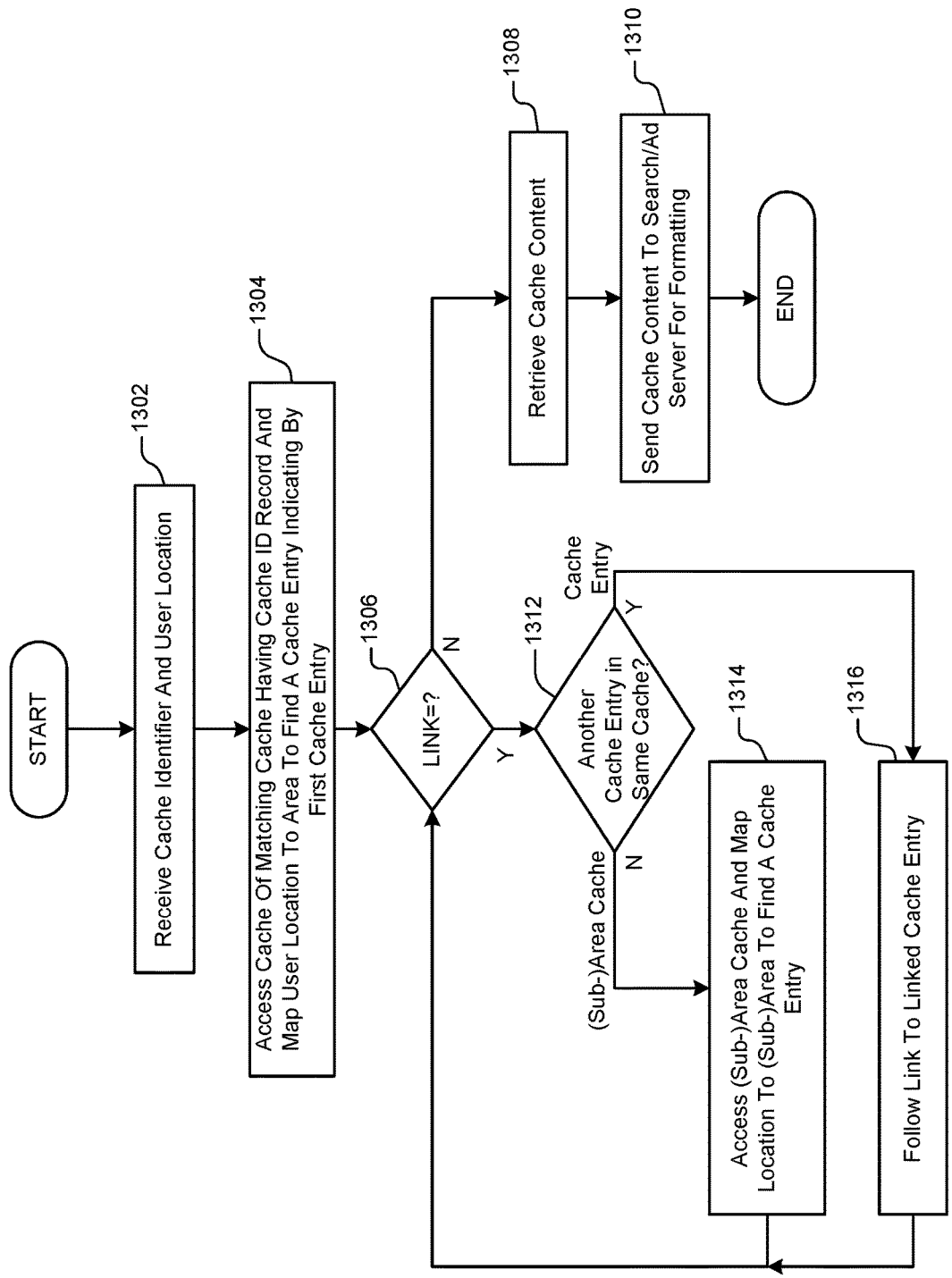
FIG. 13 illustrates a method of accessing cache content based on a user request in accordance with an embodiment of the present disclosure.

FIG. 13 illustrates a method that may be executed by cache module 510 for retrieving cache content 534b as part of an online process. In operation 1302, the cache module 510 receives a request for cache content comprising a cache identifier 531 and a user device location 214. The request may be sent by the search system 300 and/or the advertising system 400.

The user device location 214 may be a current location of the user device 200, or some other location provided by the user device 200. The user device location 214 may be specified by coordinates. Alternately, the user device location 214 may be an address, a name of a landmark, or the like. In this example, the search system 300, advertising system 400, and/or cache system 500 may convert the user device location 214 to the coordinate system used by the cache (e.g., GPS) using a location conversion function.

In operation 1304, cache module 510 accesses the cache 533 that matches the cache identifier 531 and finds the cache entry 534 that maps to the user device location 214. The cache module 510 may use a mapping function 535 that maps a location to a particular area in order to find the correct cache entry 534. With the area determined by the mapping function 535, the cache module 510 accesses the cache entry 534 containing the area output by the mapping function 535.

In operation 1306, the cache module 510 may check the link field 534c of the cache entry 534 to determine whether the cache content field 534b includes a link or not. If the link field 534c is omitted, the cache module 510 may directly check the cache content field 534b to determine if the cache content 534b is formatted as a link or not. In either case, if the cache module 510 determines that the cache content 534b is not a link, the cache module 510 retrieves the cache content 534b from cache entry 534 in operation 1308.

After retrieving cache content 534b, in operation 1310, the cache module 510 sends cache content 534b to the search system 300 and/or advertising system 400 for optional formatting before transmission to a user. In some embodiments, the local content 150 may be formatted before the local content is stored in the cache, and a further formatting operation may be unnecessary.

Returning to operation 1306, if the cache module 510 determines the cache content 534b does contain a link, the cache module 510 checks whether the link references another cache 533 or another cache entry 534 in operation 1312. The link may reference a lower level cache 533 if the area was divided according to the method of FIG. 10. The link may reference another cache entry 534 if a link was created according to the method of FIG. 6. If the link references another cache 533, the link includes a reference for accessing the target cache 533.

In operation 1314, cache module 510 may retrieve the reference and access the target cache 533. The target cache 533 may be a sub-area cache (e.g., cache 533-2) or any other lower level cache (e.g., cache 533-3 . . . n). The cache module 510 searches for the cache entry 534 corresponding to the user device location 214 in a similar manner as for operation 1304. In operation 1314, the cache module 510 may use a different mapping function 535 than for operation 1306 (e.g., a mapping function 535-2 for cache 533-2). Each of the caches 533 may be compatible with a different mapping function 535. After locating the matching cache entry 534, the cache module 510 repeats the method from operation 1306.

In operation 1312, if the cache module 510 determines the link references another cache entry 534 in the same cache 533, the cache module 510 follows the link to find the target cache entry 534. The link may contain a reference to an area that the cache module 510 uses to look up the target cache entry 534. After locating the target cache entry 534, the cache module 510 repeats the process from operation 1306.

The cache module 510 may iterate through one or more loops of the method several times before locating the cache content 534b to send to the search system 300 and/or advertising system 400. For example, the cache module 510 may locate a first cache entry 534 in a first cache 533-1. The first cache entry 534 may link to a target lower level cache 533-2. The cache module 510 then accesses the target cache 533-2 and finds a matching cache entry 534. The cache content 534b for the matching cache entry 534 may link to another target lower level cache 533-3, which the cache module 510 may access and again find a target third cache entry 534. This time, the third cache entry 534 may link to a target fourth cache entry 534 of the same cache 533-3. The cache module 510 may access the fourth cache entry 534 and retrieve and send the cache content 534b.

Search System

Referring to FIGS. 1-2, the search system 300 includes a search module 310 in communication with a search data store 320. The search data store 320 may include one or more databases, indices (e.g., inverted indices), tables, files, or other data structures which may be used to implement the search system 300. The search module 310 receives a query wrapper 210 and generates results 220 based on the data from the cache data store 520. The search module 310 may locate and retrieve data from the cache data store 520 using search (or function) records 330 in the search data store 320. In some implementations, the search module 310 receives a query wrapper 210 from the user device 200 and performs a search for function records 330 included in the search data store 320 based on data included in the query wrapper 210, such as a search query 212. The function records 330 may include the access information 202 that the user device 200 can use to access different functions for a variety of different applications, such as native applications installed on the user device 200. The search module 310 transmits search results 220 including a list of access information to the user device 200 that generated the query wrapper 210.

The user device 200 generates cards displaying information about displayed local entities 230 based on the received search results 220. Each of the cards displayed to the user may include an access information 202. The user may select a card the user device 200 by interacting with the card (e.g., touching or clicking the card or a specific button on the card). In response to selection of a card, the user device 200 may launch a corresponding software application (e.g., a native application or a web-browser application) referenced by the access information 202 and perform one or more operations indicated in the access information 202.

The user may access the functionality of an application on the user device 200 on which the application is installed. Additionally or alternatively, the user may access the functionality of an application via a remote computing device. In some examples, all of an application's functionality is included on the user device 200 on which the application is installed. These applications may function without communication with other computing devices (e.g., via the Internet). In additional examples, an application installed on a user device 200 may access information from other remote computing devices during operation. For example, a restaurant reviews application installed on a user device 200 may display information about restaurants in a particular location. In further examples, an application (e.g., a web-browser application) may be partially executed by the user device 200 and partially executed by a remote computing device, such as a remote computing device or processor of a server of one of the systems 300, 400, 500. For example, a web-browser application may be an application that is executed, at least in part, by a web server and accessed by a web browser of the user device 200. Example web applications may include, but are not limited to, web-based business listings, event listings, etc.

The Access information 202 may include at least one of a native application access information 202a (hereinafter "application access information"), a web access information 202b, and an application download information 202c. The user device 200 may use the access information 202 to access functionality of applications. For example, the user may select a card (one of the cards 242) including access information 202 in order to access functionality of an application indicated by the card. The search module 310 may transmit one or more application access information 202a, one or more web access information 202b, and one or more application download information 202c to the user device 200 in the search results 220.

The Application access information 202a may be a string that includes a reference to a native application and indicates one or more operations for the user device 200 to perform. If a user selects a card including application access information 202a, the user device 200 may launch the native application referenced in the application access information 202a and perform the one or more operations indicated in the application access information 202a.

Web access information 202b may include a resource identifier that includes a reference to a web resource (e.g., a page of a web application/website). For example, a web access information 202b may include a uniform resource locator (URL) (i.e., a web address) used with hypertext transfer protocol (HTTP). If a user selects a card including web access information 202b, the user device 200 may launch the web browser application and retrieve the web resource indicated in the resource identifier. Put another way, if a user selects a card including web access information 202b, the user device 200 may launch a corresponding web-browser application and access a state (e.g., a page) of a web application/website. In some examples, web access information 202b includes URLs for mobile-optimized sites and/or full sites.

Application download information 202c may indicate a location (e.g., a digital distribution platform) where a native application can be downloaded in the scenario where the native application is not installed on the user device 200. If a user selects a card including application download information 202c, the user device 200 may access a digital distribution platform from which the referenced native application may be downloaded. The user device 200 may access a digital distribution platform using at least one of the web-browser application and one of the native applications.

The search module 310 is configured to receive a query wrapper (e.g., the query wrapper 210) from the user device 200 via the distributed network 120. The query wrapper may include a search query 212, which may include text, numbers, and/or symbols (e.g., punctuation) entered into the user device 200 by the user. For example, the user may enter the search query 212 into a search field 215 (e.g., a search box) of a graphical user interface (GUI) of a search application running on the user device 200. A user may enter a search query using a touchscreen keypad, a mechanical keypad, a speech-to-text program, or other form of user input. In general, a search query may be a request for information retrieval (e.g., search results) from the search system 300. For example, a search query may be directed to retrieving the cards 242 as search results 220. A search query directed to retrieving the cards 242 linking to application functionality may indicate a user's desire to access functionality of one or more applications described by the search query.

In some examples, the search application may be a native application installed on the user device 200. For example, the search application may receive search queries 212, generate the query wrapper 210, and display received data that is included in the search results 220. In additional examples, the user device 200 may execute a web-browser application that accesses a web-based search application. In this example, the user may interact with the web-based search application via a web-browser application installed on the user device 200. In still more examples, the functionality attributed to the search application may be included as a searching component of a larger application that has additional functionality. For example, the functionality attributed to the search application may be included as part of a native/web-browser application as a feature that provides search for the native/web-browser application.

The query wrapper 210 may include additional data along with the search query 212. For example, the query wrapper 210 may include user device location 214 that indicates the location of the user device 200, such as latitude and longitude coordinates. The user device 200 may include a global positioning system (GPS) receiver that generates the user device location 214 transmitted in the query wrapper 210. In some examples, the query wrapper 210 may also include additional data, including, but not limited to, device information 216 such version of the operating system, device type, and web-browser version, and other data.

The search module 310 can use the search query 212 and the additional data included in the query wrapper 210 to generate the search results 220. The search module 310 performs a search for function records 330 included in the search data store 320 in response to the received query wrapper 210 (e.g., in response to the search query 212 and the user device location 214). In some implementations, the search module 310 generates result scores 226 for function records 330 identified during the search. The result score 226 associated with a function record 330 may indicate the relevance of the function record 330 to the search query 212. A higher result score 226 may indicate that the function record 330 is more relevant to the search query 212. The search module 310 may retrieve access information 202 from the scored function records 330. The search module 310 can transmit a result score 226 along with an access information 202 retrieved from a scored function record 330 in order to indicate the rank of the access information 202 among other transmitted access information 202.

The search module 310 may transmit additional data to the user device 200 along with the access information 202 and the result score(s) 226. For example, the search module 310 may transmit entity information 243 (e.g., text and/or images) to be displayed as part of cards 242 (e.g., as displayed local entities 230). Data for displaying multiple local entities 230 (e.g., text and/or images embedded in entity information 243) may be organized into cards 242. The user device 200 displays cards 242 to the user based on received results 220.

With reference to FIG. 1, the user device 200 may receive a set of search results 220 from the search module 310 in response to transmission of the query wrapper 210 to the search system 300. The GUI of the search application displays (e.g., renders) the search results 220 received from the search module 310 as one or more cards 242. The search application may display the search results 220 to the user in a variety of different ways, depending on what information is transmitted to the user device 200. In examples where each card 242 includes a list of access information 202 and entity information 243, the search application may display the cards 242 to the user as a list of local entities 230 associated with entity information 243 (e.g., text and images).

In some implementations, the search application displays the search results 220 as cards 242 arranged under the search field 215 in which the user entered the search query 212. Moreover, the search application may arrange the cards 242 in order based on result scores 226 associated with the cards 242.

With respect to FIG. 1, it may be assumed that Yellow Pages® and Gourmet Coffee Finder corresponds to webpages and/or applications that may be accessed on user device 200. The first card 242-1 may correspond to a Yellow Pages® webpage, whereas the second card 242-2 corresponds to a Gourmet Coffee Finder native application. Selection of card 242-1 may cause the user device 200 to launch the Yellow Pages® website to retrieve web page listing information about coffee shops near the user. Similarly, selection of card 242-2 may cause the user device 200 to launch the Gourmet Coffee Finder native application and access a function for listing information about coffee shops near the user.

In some examples, user devices 200 communicate with the search system 300 via a partner computing system (not illustrated). The partner computing system may be a computing system of a third party that may leverage the search functionality of the search system 300. The partner computing system may belong to a company or organization other than that which operates the search system 300. Example third parties which may leverage the functionality of the search system 300 may include, but are not limited to, internet search providers and wireless communications service providers. The user devices 200 may send search queries to the search system 300 and receive search results via the partner computing system. The partner computing system may provide a user interface to the user devices 200 in some examples and/or modify the search experience provided on the user devices 200.

Figure 14A:
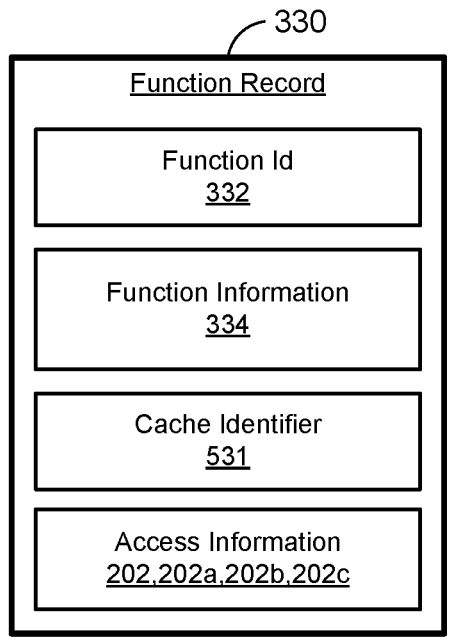
FIGS. 14A-14B are data record diagrams illustrating function records and advertising records in accordance with an embodiment of the present disclosure.

FIG. 14A illustrates an example function record 330 that may be used by search module 310. The search data store 320 includes the function records 330. Each of the function records 330 may include data related to a function of an application and/or the state of the application resulting from performance of the function. A function record may include a function identifier (ID) 332, function information 334, cache identifier 531, and one or more access information 202, 202a, 202b, 202c used to access functionality provided by an application.

The function ID 332 may be used to identify the function record 330 among the other function records 330 included in the search data store 320. The function ID 332 may be a string of alphabetic, numeric, and/or symbolic characters (e.g., punctuation marks) that uniquely identifies the associated function record 330. In some examples, the function ID 332 describes a function and/or an application state in human readable form. For example, the function ID 332 may include the name of the application referenced in the access information 202. Additionally or alternatively, the function ID 332 may be a human readable string that describes a function performed according to the access information 202 and/or an application state resulting from performance of the function according to the access information 202. In some examples, the function ID 332 includes a string in the format of a URL of web access information 202b for the function record 330, which may uniquely identify the function record 330.

The function information 334 may include data that describes an application state into which an application is set according to the access information 202 in the function record 330. Additionally or alternatively, the function information 334 may include data that describes the function performed according to the access information 202 included in the function record 330. The function information 334 may include a variety of different types of data, such as structured, semi-structured, and/or unstructured data. The function information 334 may be automatically and/or manually generated. Moreover, the function information 334 may be updated, such that up-to-date search results 220 can be provided in response to a search query 212.

In some examples, the function information 334 includes data that may be presented to the user by an application when the application is set in the application state defined by the access information 202. For example, if one of the access information 202 is application access information 202a, the function information 334 may include data that describes a state of the native application after the user device 200 has performed the one or more operations indicated in the application access information 202a. For example, if the function record 330 is associated with a restaurant reviews application, the function information 334 may include data specifying what type of restaurants are shown (e.g., different cuisine types, price levels, etc.) when the reviews application is set to the application state defined by the access information 202. As another example, if the function record 330 is associated with a local business listings application, the function information 334 may include data that describes what type of local businesses will be shown when the application is set to the application state defined by the access information 202.

The cache identifier 531 may identify a cache record 530 associated with the function record 330. For example, the cache identifier for a function record 330 pertaining to a Gourmet Coffee Finder application may identify the cache record containing cache 533 that stores content cached from a Gourmet Coffee Finder content provider 130. Using the cache identifier 531, search module 310 may request cache content corresponding to a function record 330.

Figure 15:
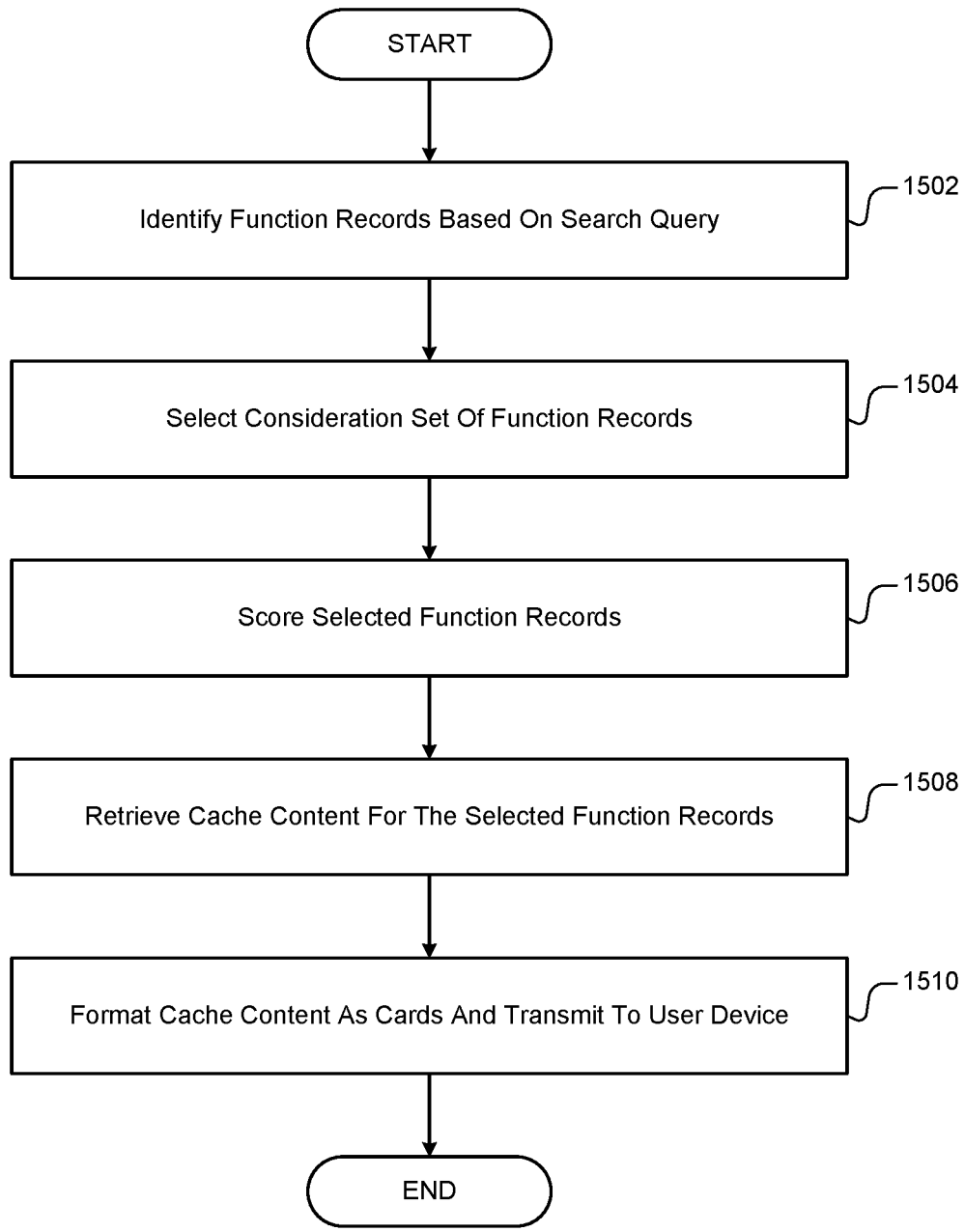
FIG. 15 illustrates a method of accessing cached content via a search system in accordance with an embodiment of the present disclosure.

FIG. 15 provides an example arrangement of operations for a method executed by search module 310 generating search results. At operation 1502, the method includes identifying function records 330 based on a search query 212. The search module 310 identifies function records 330 in the search data store 320 based on the search query 212 received in the query wrapper 210. For example, the search module 310 may identify function records 330 in the data store 320 by detecting search term matches between terms (i.e., words) of the search query 212 and terms included in the function information of the function records 330.

At operation 1504, the method includes selecting a consideration set of function records 330. The search module 310 selects a set of function records 330 from those function records 330 identified at operation 1502. The selected set of function records 330 may be referred to as a "consideration set" of function records 330 and/or function identifiers 332 of those function records 330. The search module 310 may score the consideration set of function records 330 and include information related to the consideration set of function records 330 in the search results 220.

At operation 1506, the method includes scoring the consideration set of function records 330. For example, the search module 310 may generate a score (e.g., results score 226) for each of the function records 330 that indicates the relevance of the function record 330 to the search query 212.

At operation 1508, the method includes retrieving cache content 534b for the selected function records 330. The search module 310 may send a request to cache system 500 including a cache identifier 531 obtained from each function record 330 in the set of selected function records. The request further includes a user device location 214. In some embodiments, the search module 310 only requests cache content 534b for the top N number of function records.

At operation 1510, the method further includes receiving the cache content 534b from cache system 500 and formatting the cache content 534b as cards 242. In some embodiment, the search module 310 may use templates and/or formatting rules to give the cards 242 a uniform look and feel. For example, the cache content 534b may include local entity 151 information such as entity name, entity location, etc. Local entity information may be formatted as key value pairs (e.g., in JSON format). The search module 310 may obtain particular data fields from the cache content 534b and populate different portions of a template with different fields in order to yield a card. The search module 310 further associates one or more access information 202 from function record 330 with the card, such that a user may select a card to access an application or webpage associated with the particular card. The access information may be selected based on device information from a query wrapper in order to select the access information that is compatible with the user device 200. In some embodiments, a content provider may provide local content in a displayable format which may be stored as part of cache content (e.g., in HTML format). In these examples, the search module 310 may further format the content by fitting the content into a card of a standard size. After formatting cards 242, the search module 310 transmits the results to the user device 200.

Advertising System

An advertising system 400 may be similar to search system 300 in that the advertising system 400 may generate a card (e.g., one of cards 242) as an advertisement. For example, advertising system 400 may embed cards 242 in webpages, native applications, or other locations where ads may be embedded. Although applications and/or web pages running on user devices 200 may request advertisements directly, in some embodiments, query wrapper 210 containing an ad query 212 may be received from an advertising DSP, ad server, or other ad system.

In other embodiments, search system 300 forwards a search query wrapper 210 to the advertising system 400 so that advertising cards may be embedded in the search results 220. In these embodiments, the advertising cards may be interleaved with search cards or arranged in special areas of search results 220.

The advertising module 410 is configured to receive a query wrapper (e.g., the query wrapper 210) from the user device 200 via the distributed network 120. A query wrapper may include an ad query, which may include text, numbers, and/or symbols. In advertising embodiments, the query may be automatically generated by an advertising provider (e.g., a native application or web page that displays advertisements). In general, a search query may be a request for information retrieval (e.g., ad results) from the advertising system 400.

In some examples, the advertising application may be a native application installed on the user device 200. For example, the advertising application may automatically create query wrappers related to content displayed in the advertising application (e.g., based on keywords associated with a displayed article) including a query and targeting information 218, and display a received card as an embedded advertisement. In additional examples, the user device 200 may execute a web-browser application that accesses the advertising system 400. In this example, a local script running on user device as part of the web page may send a query to advertising system 400.

The query wrapper may include additional data along with the search query. For example, the query wrapper may include user device location that indicates the location of the user device 200, such as latitude and longitude coordinates. The user device 200 may include a global positioning system (GPS) receiver that generates the user device location transmitted in the query wrapper. In some examples, the query wrapper may also include additional data, including, but not limited to, device information such version of the operating system, device type, and web-browser version, and other data.

In advertising embodiments, the query wrapper may further include ad targeting information (e.g., information about a context in which the advertisement will be shown, information about the user, etc.).

The advertising module 410 can use the search query and the additional data included in the query wrapper to select an ad result comprising a card. The advertising module 410 performs a search of the advertising records 430 included in the advertising data store 420 in response to the received query wrapper (e.g., in response to the search query, the targeting information, and the user device location). In some implementations, the advertising module 410 generates result scores 226 for the advertising records 430 identified during the search, and selects (N) top-scored advertising record(s) 430 to generate advertising card(s) (e.g., some of cards 242). The result scores 226 associated with the advertising records 430 may indicate the relevance of the advertising records 430 to the advertising query and/or targeting information. A higher result score 226 may indicate that the advertising record 430 is more relevant to the advertising query and/or targeting information. The advertising module 410 may retrieve access information from the selected advertising record(s) 430.

The advertising module 410 may transmit additional data to the user device 200 along with the access information. For example, the advertising module 410 may transmit entity information 243 (e.g., text and/or images) to be displayed as part of cards 242 (e.g., as displayed local entities 230). Data for displaying multiple local entities 230 (e.g., text and/or images embedded in entity information 243) may be organized into advertising cards. The user device 200 displays advertising card(s) to the user.

Figure 14B:
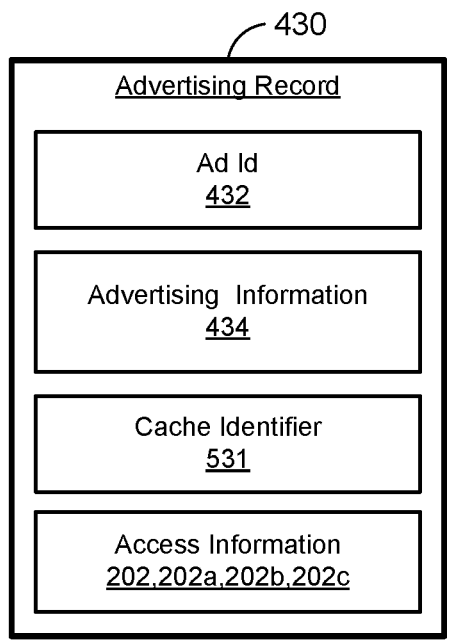

FIG. 14B illustrates an example advertising record 430 that may be used by advertising module 410. The advertising data store 420 includes the advertising records 430. Each of the advertising records 430 may include data related to a function of an application and/or the state of the application resulting from performance of the function. An advertising record may include an advertising identifier (ID) 432, advertising information 434, cache identifier 531, and one or more access information 202, 202*a*, 202*b*, 202*c* used to access functionality provided by an application.

The advertising ID 432 may be used to identify the advertising record 430 among the other advertising records 430 included in the advertising data store 420. The advertising ID 432 may be a string of alphabetic, numeric, and/or symbolic characters (e.g., punctuation marks) that uniquely identifies the associated advertising record 430. In some examples, the advertising ID 432 describes a function and/or an application state in human readable form. For example, the advertising ID 432 may include the name of the application referenced in the access information. Additionally or alternatively, the advertising ID 432 may be a human readable string that describes a function performed according to the access information and/or an application state resulting from performance of the function according to the access information. In some examples, the advertising ID 432 includes a string in the format of a uniform resource locator (URL) of web access information for the advertising record 430, which may uniquely identify the advertising record 430.

The advertising information 434 may include data that describes an application state into which an application is set according to the access information in the advertising record 430. Additionally or alternatively, the advertising information 434 may include data that describes the function performed according to the access information included in the advertising record 430. The advertising information 334 may include a variety of different types of data, such as structured, semi-structured, and/or unstructured data. The advertising information 434 may be automatically and/or manually generated. Moreover, the advertising information 434 may be updated, such that up-to-date search results can be provided in response to a search query 212.

In some embodiments, advertising information 434 further includes placement information set by the advertiser such as campaign information, placement rules, target spend, and the like. Advertising module 410 may use such information to filter, select, and/or modify result scores 226 of advertising records 430 in order to select an appropriate advertisement card to send to user device 200. Particularly, targeting information 218 received from the user may be matched to placement information including in advertising information 434 in order to select advertising records 430.

The cache identifier 531 may identify a cache record 530 associated with the advertising record 430. For example, the cache identifier for an advertising record 430 pertaining to a Star Brews webpage may identify the cache record including cache 533 that stores content cached from a Star Brews advertising content provider 130. Using the cache identifier 531, advertising module 410 may request cache content corresponding to an advertising record 430.

Figure 16:
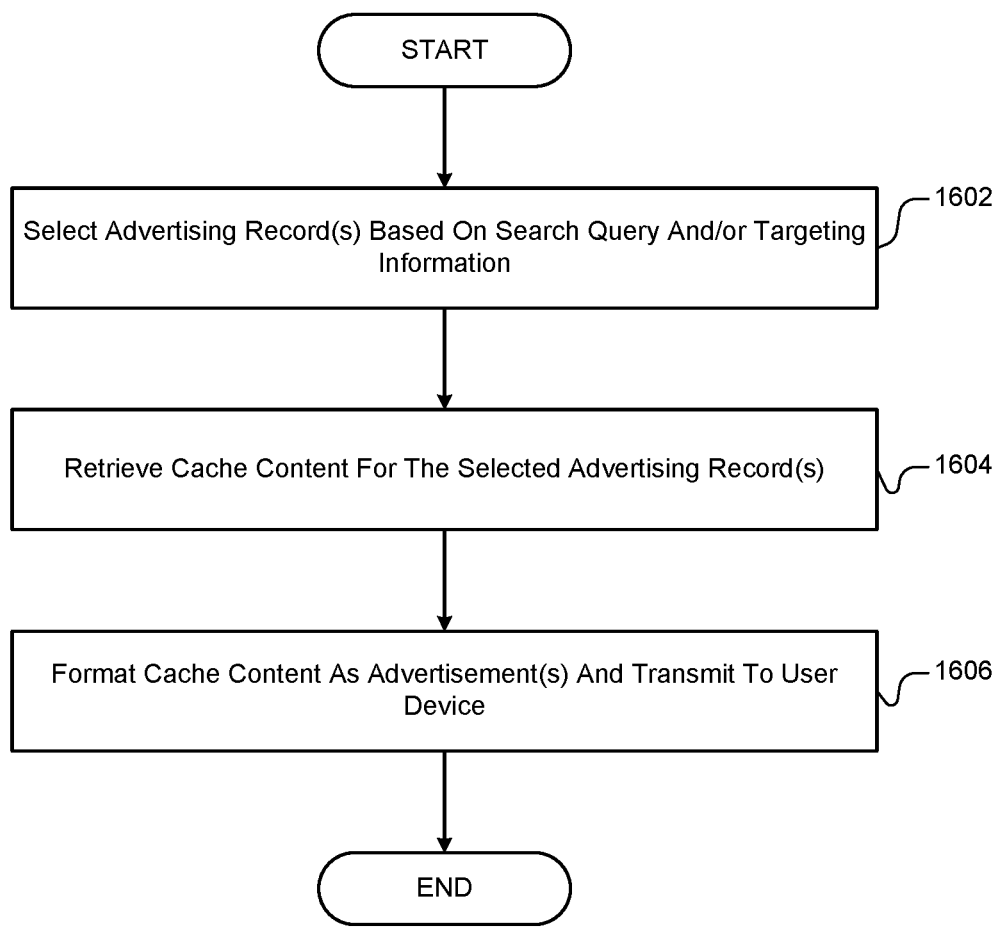
FIG. 16 illustrates a method of accessing cached content via an advertising system in accordance with an embodiment of the present disclosure.

FIG. 16 provides an example arrangement of operations for a method executed by advertising module 410 generating advertising cards. At operation 1602, the method includes selecting advertising records 430 based on a search query 212 and/or targeting information 218. The advertising module 410 identifies advertising records 430 in the advertising data store 420 based on the search query 212 and/or targeting information 218 received in the query wrapper 210. For example, the advertising module 410 may identify advertising records 430 in the data store 420 by detecting search term matches between terms (i.e., words) of the search query 212 and terms included in the function information of the function records 330. Additionally or alternatively, the advertising module 410 may identify the advertising records containing advertising information that matches the targeting information 218. Operation 1602 further optionally includes scoring the selected advertising records 430. For example, the advertising module 410 may generate a score (e.g., a result score 226) for each of the advertising records 430 that indicates the relevance of the advertising records 430 to the query 212 and/or targeting information 218.

At operation 1604, the method includes retrieving cache content for the selected advertising records 430. Advertising module 410 may send a request to cache system 500 including a cache identifier 531 obtained from each of the advertising records 430 selected in operation 1602. The request further includes a user device location 214.

At operation 1606, the method further includes receiving the cache content 534b from cache system 500 and formatting the cache content 534b as advertising cards. In some embodiments, advertising module 410 may use advertising templates and/or formatting rules to give the advertising cards a uniform look. For example, the cache content 534b may include local entity information such as entity name, entity location, etc. Local entity information may be formatted as key value pairs (e.g., in JSON format). The advertising module 410 may obtain particular data fields from the cache content 534b and populate different portions of an advertising template with different fields in order to yield advertising card. The advertising module 410 further associates access information from the advertising record 430 with a card such that a user may select a card to access an application or webpage associated with the particular card. Access information may be selected based on device information from a query wrapper in order to select access information that is compatible with the user device 200. In some embodiments, the content provider 130 may provide local content in a displayable format which may be stored as part of cache content (e.g., in HTML format). In these examples, the advertising module 410 may further format the content by fitting it into an advertising card (e.g., one of cards 242) of a standard size. After formatting cards, the advertising module 410 transmits the results to the user device 200.

User Devices

Figure 18:
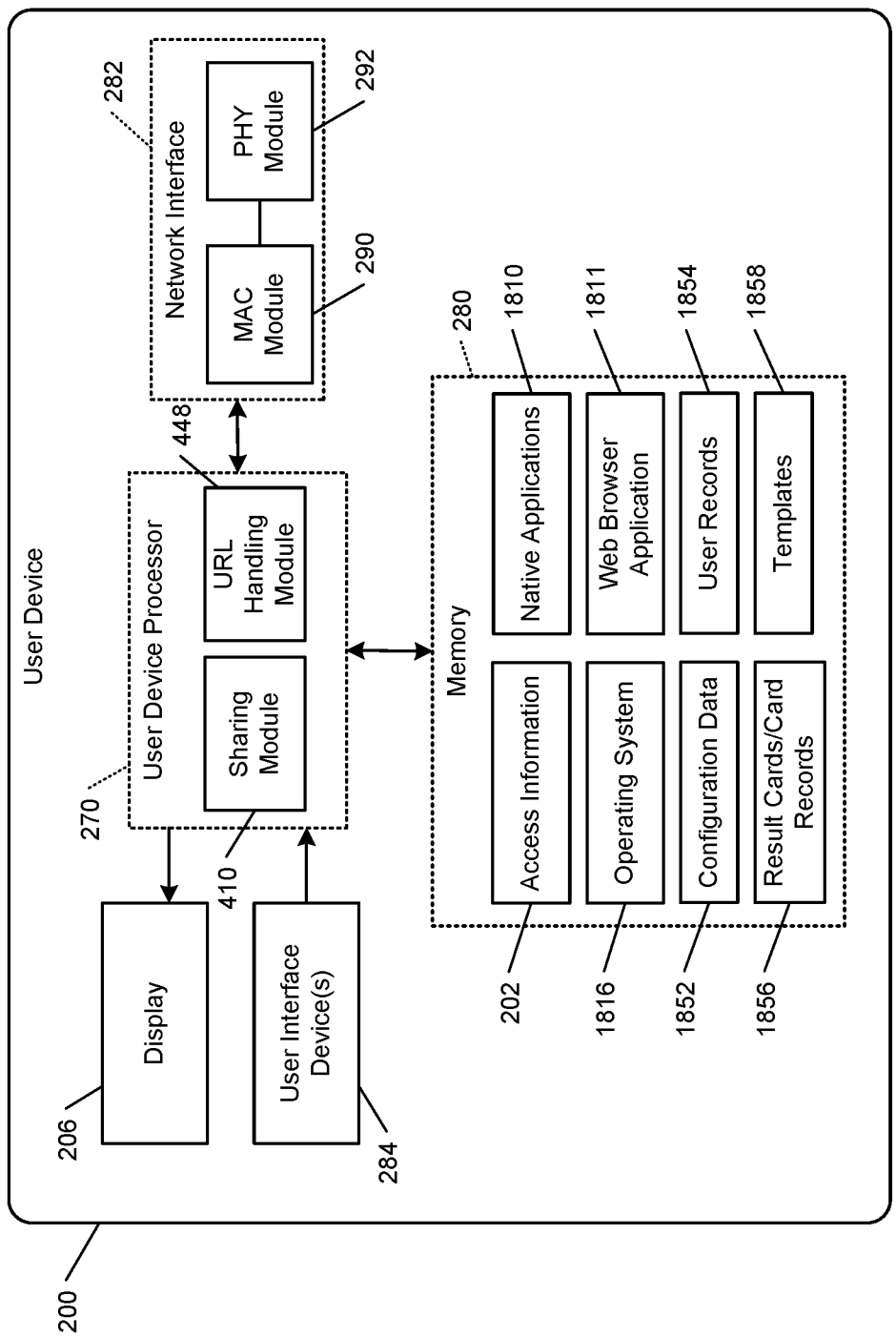
FIG. 18 is a functional block diagram of a user device in accordance with an embodiment of the present disclosure.

FIGS. 1, 2 and 18 show example user devices in communication with the systems 300, 400, 500. The user devices 200 may be network devices that are capable of providing queries to the search system 300 and/or advertising system 400. The user devices 200 may include mobile computing devices, such as laptops 200a, tablets 200b, smart phones 200c, and wearable computing devices 200d (e.g., headsets and/or watches). The user devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems. In examples where a user device 200 is a mobile device, the user device 200 may run an operating system including, but not limited to, ANDROID® developed by Google® Inc., IOS® developed by Apple® Inc., or WINDOWS PHONE® developed by Microsoft® Corporation. Accordingly, the operating system running on the user device 200 may include, but is not limited to, one of ANDROID®, IOS®, or WINDOWS PHONE®. In an example where a user device is a laptop or desktop computing device, the user device may run an operating system including, but not limited to, MICROSOFT WINDOWS® by Microsoft® Corporation, MAC OS® by Apple®, Inc., or Linux. The user devices 200 may also access the search system 300 or advertising system 400 while running operating systems other than those operating systems described above, whether presently available or developed in the future.

A software application may refer to computer software that, when executed by a computing device, causes the computing device to perform a task. In some examples, a software application may be referred to as an "application", an "app", or a "program". Example software applications include, but are not limited to, word processing applications, spreadsheet applications, messaging applications, media streaming applications, social networking applications, and games.

Applications can be executed on a variety of different user devices 200. In some examples, applications may be installed on a user device 200 prior to a user purchasing the user device 200. In other examples, the user may download and install applications on the user device 200.

In general, the user device 200 may communicate with the search system 300 using any software application that can transmit search queries. In some examples, the user device 200 runs a native application that is dedicated to interfacing with the systems 300, 400, 500, such as a native application dedicated to searches (e.g., a search application). In some examples, the user device 200 communicates with the systems 300, 400, 500 using a more general application, such as a web-browser application accessed using a web browser. Although the user device 200 may communicate with the systems 300, 400, 500 using a native application and/or a web-browser application, the user device 200 may be described hereinafter as using the native search application to communicate with the systems 300, 400, 500.

Figure 17:
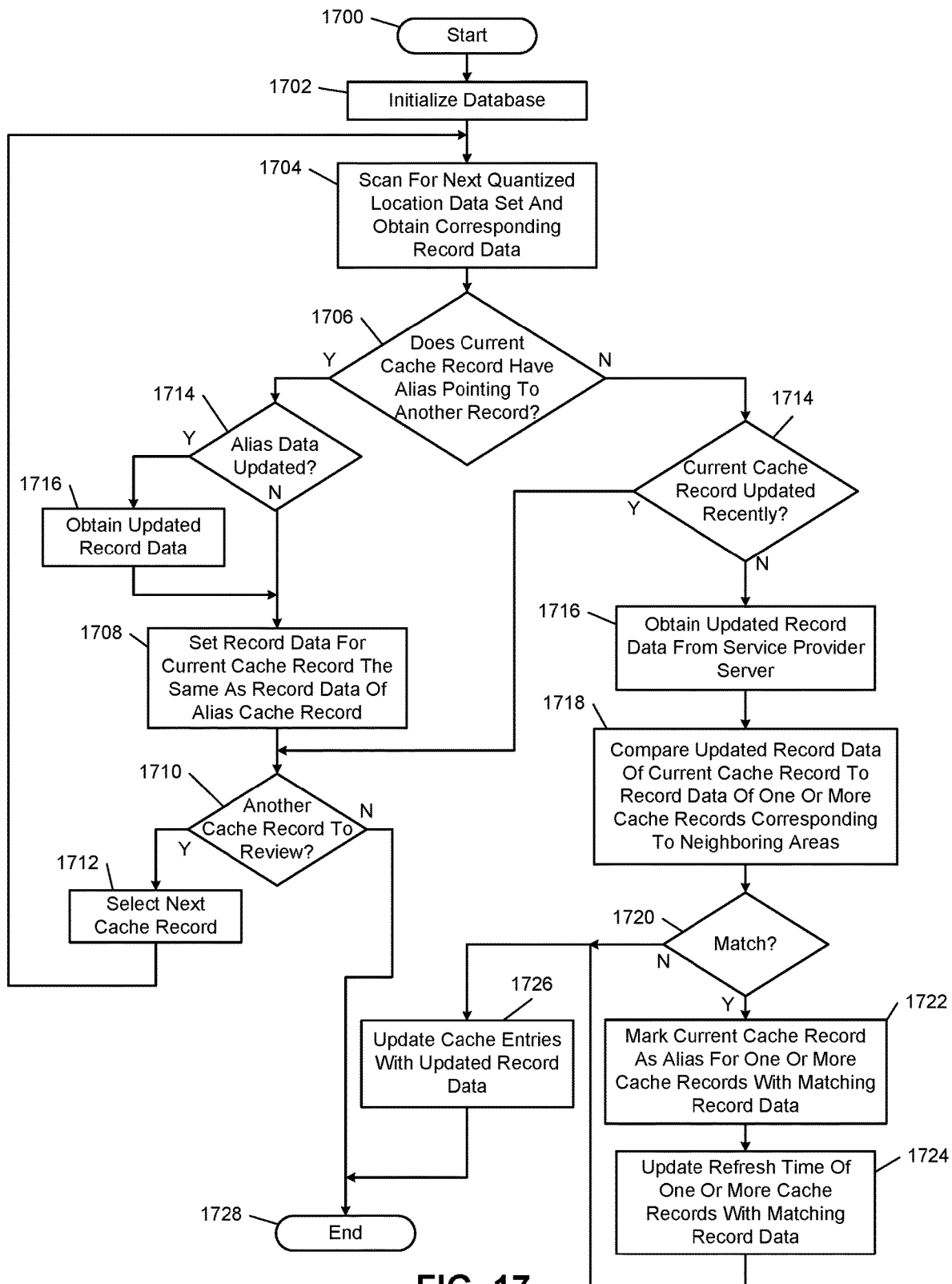
FIG. 17 illustrates a method of selectively updating at least some cache records in accordance with an embodiment of the present disclosure.
Figure 19:
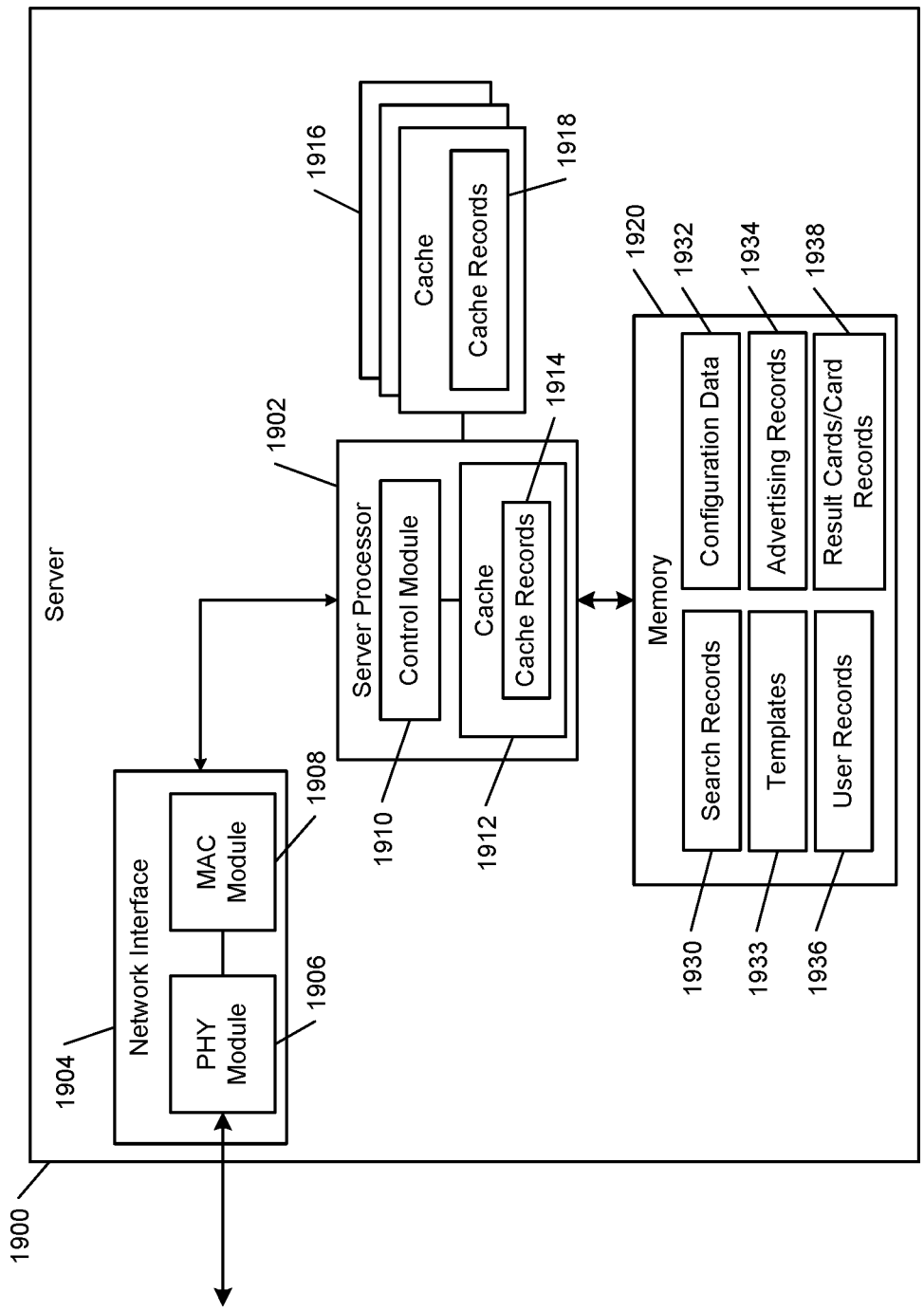
FIG. 19 is a functional block diagram of a server in accordance with an embodiment of the present disclosure.

FIG. 17 shows a method of selectively updating at least some cache records. Although the following operations are primarily described with respect to the implementations of FIGS. 1-2, the operations may be modified to apply to other implementations of the present disclosure. The operations may be iteratively performed. The number of iterations may be based on a predetermined number of pre-fetches to perform for a given area. The following tasks may be performed for one or more areas (and/or sub-areas). The method may begin at 1700. At 1702, a database may be initialized. The database may be stored in a cache of a cache system (e.g., the cache system 500 of FIGS. 1-2) and may include cache records with cache entries. The initialization may include loading the database into the cache, a cache of a processor of a cache server and/or other memory of the processor. An example of the processor is shown in FIG. 19.

At 1704, the cache module 510 may scan the cache for a next quantized location data set and obtain corresponding record data. The obtained record data is from and/or included in a current cache record.

At 1706, the cache module 510 may determine whether the current cache record has an alias (or link) pointing to another cache record (referred to as the "alias cache record"). If yes, then operation 1708 is performed, otherwise operation 1714 is performed. At 1708, the cache module 510 may determine whether the record data of the alias cache record has been updated within the last predetermined period of time (i.e. amount of time since refresh time of alias cache record has exceeded the predetermined period of time). The refresh time may refer to a date and a time. If yes, operation 1710 may be performed, otherwise operation 1709 may be performed. In one embodiment, operations 1708 and 1709 are not performed and operation 1710 is performed subsequent to operation 1706.

At 1709, the cache module 510 may obtain updated record data for the alias cache record. This may include the cache module 510 transmitting a content request to a service provider server to obtain the updated record data. The cache module 510 receives the updated record data from the service provider server. At 1710, the cache module 510 sets record (or content) data for the current cache record to be the same as the record data of the alias cache record.

At 1711, the cache module 510 may determine whether another cache record is to be reviewed. If yes, operation 1712 is performed, otherwise the method may end at 1728. At 1712, the cache module 510 selects a next cache record and returns to operation 1704. The next cache record becomes the current cache record for operation 1704.

At 1714, the cache module 510 determines whether the current cache record has been updated in the last predetermined period of time (i.e. amount of time since refresh time of current cache record has exceeded the predetermined period of time). If yes, operation 1711 may be performed, otherwise operation 1716 is performed.

At 1716, the cache module 510 obtains updated record data from the service provider server for the current cache record. This may include transmitting a content request to the service provider server. The cache module 510 receives the updated record data from the service provider server.

At 1718, the cache module 510 compares the updated record data of the current cache record to record data of one or more cache records corresponding to areas neighboring an area corresponding to the current cache record. At 1720, the cache module 510 determines whether there is a match between the updated record data and the record data of the one or more cache records corresponding to the neighboring areas. If there is a match, operation 1722 is performed, otherwise operation 1726 is performed.

At 1722, the cache module 510 marks the current cache record as an alias for one or more of the matching cache records corresponding to the one or more neighboring areas. At 1724, the cache module 510 updates a refresh time of the matching cache records.

At 1726, the cache module 510 updates cache entries of current cache record with updated record data obtained from the service provider server. Subsequent to operation 1726, the method may end at 1728.

The above-described operations of FIG. 17 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

When implementing a caching scheme for card record rendering, many functions are location-dependent. Unfortunately, a function cannot be "rendered" (generated/loaded) once and then provided to all user devices. A solution to this is to create a geo-fence or a minimum region and treat user devices inside the region defined by the geo-fence as if the user devices are the same and/or in the same location.

For example, searching for "nearby Chinese restaurants" in Yelp provides different answers to a user device in Mountain View than a user device in neighboring Santa Clara. To solve this problem, two caches may be provided (e.g., two of the caches of the cache system 500 of FIGS. 1-2, where one cache is for Mountain View and the other cache is for Santa Clara. In one embodiment, a map of the world is divided up into areas using a grid based on global positioning system (GPS) coordinates. As an example, every increment of a 3rd digit of coordinates may be considered equal. For example, the coordinates (37.394405, −122.079723) may be considered the same as the coordinates (37.394, −122.079). By dividing the map into areas, the above-described methods are enabled to pre-fetch function URLs for card record rendering.

In one embodiment, a geo-fence is fixed with fixed boundaries. In another embodiment, a geo-fence has dynamic boundaries that are adjusted. With a fixed boundary geo-fence (e.g., every 0.5 kilometers (km) or coordinates round to the nearest 4th digit), a possibility of over-fetching exists. For example, while two users in San Francisco who are 1 km apart may want different results. Thus, different search results should be provided. As another example, a user 10 miles west of Cheyenne, Wyo. and a user 20 miles west of Cheyenne, Wyo. may be provided with identical results and hence a single pre-fetch for every mile between them should not be performed. The same search result may be provided to user devices of both of the users.

As a result, there is a trade-off between precision (i.e. how small to make the "geo-fence area") and a number of pre-fetches required. The more precise (dense) the search, the more pre-fetches needed to cover the area of concern. Some of the embodiments disclosed herein, include automatically learning that sub-regions (or sub-areas) of arbitrary shape are equivalent and do not require as frequent an update. This effectively lowers cost of a pre-fetch, without sacrificing precision.

Some of the disclosed embodiments allow for discovering equivalence of search results, which reduces the amount of pre-fetching performed. The method of FIG. 17 involves adding a check for "is content similar to neighbor" and if the content is similar, then using a field to indicate an alias. For example, add field: record.alias Boolean (True/False), record.alias_destination (record_id) or null. The method includes: initializing the database; scanning possible quantized locations; for each location, obtaining record.data, and if record.alias==True then Obtain (record.alias_destination).data for alias destination and set record.data=(record.alias_destination).data, else Check if last_updated for record.data in database that has been updated sufficiently recently. If yes, next quantized location reviewed. If record.alias==False, then fetch data for corresponding quantized location and update record.last_updated and call update-aliases(record) function and then review next quantized location, else fetch data for record.alias_destination and update (record.alias_destination).data and (record.alias_destination).last_updated. This process may then be repeated until there are no further quantized locations to be reviewed.

In another embodiment, a function referred to as "update-aliases (record)" is performed. Given a record, the content of this record is checked versus the content of neighboring records (or content of aliased records of the neighboring records). As described above at least with respect to FIG. 17, if the content of a record is deemed a duplicate, then this record is marked as an alias, and the refresh date of the record for which this is an alias is updated to the fetch time. For each record, if record.alias==False, goto next record, set record.alias==False, and for each neighbor record: a) Get neighbor_content//If this is an alias, fetch the content of the record for which this is an alias and b) If record.content==neighbor_content, i) Set record.alias=true and record.alias_destination=neighbor_id, ii) Set neighbor_record.last_updated=now, and iii) Break//(skip to next record in outer loop).

In some embodiments, when a record is an alias the content is re-checked for being an alias. Some random percent of the time the record is re-fetched (independent of expiration time) the alias-status is reset and the content of the record is re-checked for being an alias. In another embodiment, if the record is an alias, no further checking is performed. Instead, the cache module 510 proceeds to the next location (this is not as complex, but could result in a delay before updating a particular record that is the source for a large virtual area).

In one embodiment, the cache module 510 creates an initial grid based on a known application, a query and a geographical location. This is referred to as pre-caching. Any number of initial grids may be created of any size and divided into any number of areas. Each grid may have a grid ID and each data point/cache record may have a record ID. The cache module 510 may access the cache records based on the grid IDs and the cache record IDs. A table may be stored that relates the applications, queries, geographical locations, grid IDs, and cache record IDs. The grids may cover a certain region, multiple regions, or the world. Each of the grids may be a fine grid having a large number of data points or a course grid having a smaller number of data points. Each data point refers to (i) a cache record having search result content for a geographical area (or sub-area) of the grid, or (ii) a cache record including a link to a cache record having search result content. In an embodiment, the cache records are updated periodically, randomly, linearly, and/or semi-randomly. The grid may be divided as described above based on densities of search results for the query and geographical location. The cache module may add to the existing grids or generate new grids when new queries are provided from user devices.

In an embodiment, when a new query is provided and/or a new data point is to be created, the content to be included in the corresponding data record may be compared with content in a cache record of a neighboring area. If the contents match, the content in the cache record of the neighboring area may be provided and a link may be created between the data points. In an embodiment, cache records that have links may not be refreshed as often as cache records that have search result content. Although search results content of a cache record and/or a link may be unchanged during an update event, a refresh time for the cache record is updated. The updating of a cache record may include copying content from another cache record and/or obtaining updated content from a service provider server.

In an embodiment, cache records that have links may be skipped during an update event. The cache records having links may be updated based on a different schedule than the updating schedule of the cache records having search result content. The links may be created, broken, skipped, and/or refreshed. More updates and time is involved in creating and updating a grid than later when the grid is established. As duplicate data points are created, less updates to the grid are performed. In an embodiment, when search result content of a cache record of a neighboring area is provided to a user, a distance parameter may be altered and/or not provided due to an increased size of the area over which the search results are based.

In an embodiment, a course grid is created. A query is provided from a user device and a nearest most updated data point (or cache record) is provided to the user device. Optionally, after the search data results of a first cache record are presented to the user of the user device, the cache module 510 searches for a precise/actual values/content for the query. The cache module 510 then compares the search result content of the first cache record to the precise/actual values/content for the query to determine if there is a match. If different, the first cache record is updated and/or replaced. This may increase grid density. A second query may then be received. If the second query is the same, an alias assignment/link is created, where the first cache record and a second cache record corresponding to the second query are linked.

In an embodiment, all database rights/results are atomic and blocking, such that a result is provided for each search. The disclosed methods allow for quick search response times while minimizing number of refreshes of the cached content within a predetermined period of time. Search results are pre-cached in a server of a cloud-based network prior to receiving a query for the search results and thus can be quickly looked-up. The user of the user device does not experience a delay in obtaining the search results from a service provider server, as the search results are already stored at the cloud-based network server and readily available for download. Alias assignment and link generation minimizes the amount of search result content cached and updated.

FIG. 18 shows an example of the user device 200, which includes a user device processor 1870 in communication with memory 1880, a network interface 1882, user interface devices 1884 and/or display 1806. The network interface 1882 may include a media access control (MAC) module 1890 and a physical layer (PHY) module 1892, which communicates with other user devices, servers, networks, network devices etc. disclosed herein. The user device 200 may include other components and/or systems, such as a global positioning system 1894 for determining a location of the user device 200. The user device processor 1870 is configured to execute instructions stored in the memory 1880 that when executed cause the user device processor 1870 to perform operations. In some examples, the user device processor 1870 executes one or more of a native application 1810, a web browser application 1811, and an operating system 1816, all of which may be embodied as computer readable instructions. The operating system 1816 may act as an interface between the user device processor 1870 and the applications.

In some implementations, the user device processor 1870 executes an application. The application is a set of computer readable instructions embedded in a native application. In the example shown, the user device processor 1870 executes the control module 1850, which may be stored in the memory 1880. In other examples, the memory 1880 is located remotely from the user device 1800 and/or the control module 1850.

The memory 1880 may store programs (e.g., sequences of instructions) or data (e.g., program state information) on a temporary or permanent basis and perform as non-transitory memory for use by a computing device. For example, the memory 1880 may store the computer readable instructions that make up the native applications 1810, the web browser apps 1811, the operating system 1816, and/or the control module 1850. The non-transitory memory may be volatile and/or non-volatile addressable semiconductor memory. Examples of non-volatile memory include flash memory, read-only memory (ROM), programmable read-only memory (PROM), erasable programmable read-only memory (EPROM), electronically erasable programmable read-only memory (EEPROM) (e.g., typically used for firmware, such as boot programs). Examples of volatile memory include random access memory (RAM), dynamic random access memory (DRAM), static random access memory (SRAM), and phase change memory (PCM). The network interface 1882 includes one or more devices configured to communicate with the distributed network 120. The memory 1880 may also store access information 202, configuration data 1852, user records 1854, card records 1856 and/or other information.

The user records 1854 may include information regarding the user device 200, such as a user name, a device type, a device operating system, a display size, a display type, installed applications, allowed users, blocked users, preferences, and or other information. The configuration data 1852 may include information on how to map the cards or application states into a data object or how to display the data object into cards or application states. The configuration data 1852 may include information on how to map information from result cards (or card records) 1856 into the templates 1858 in order to render cards. The configuration data 1852 may be a binding file that maps fields in application state information to fields in the templates 1858. This allows the templated 1858 to be populated by the proper fields, such as title, description, image, and additional data fields. The configuration data 1852 may also include formatting data, such as font size/color. In some embodiments, the configuration data 1852 is platform-specific, but may be platform-agnostic if a given template uses the same naming conventions across various platforms. The configuration data 1852 can be transmitted as part of the data object or downloaded from the memory 1920 of, for example the server 1900 of FIG. 19.

The network interface 1882 may include one or more transceivers for performing wired or wireless communication. Examples of the network interface 1882 include a transceiver configured to perform communications using the IEEE 802.11 wireless standard, an Ethernet port, a wireless transmitter, and a universal serial bus (USB) port. The user interface devices 1884 include one or more devices that receive input from and/or provide output to a user. The user interface devices 1884 may include a touchscreen, a display, a QWERTY keyboard or other keyboard, a numeric keypad, a touchpad, a microphone, and/or speakers.

FIG. 19 shows an example of a server 1900 (e.g., one of the servers 301, 401, 501 of FIG. 2). The server 1900 includes a server processor 1902, memory 1920 and a network interface 1904. The server processor 1902 may include a control module 1910 and one or more cache(s) 1912 with cache records 1914. The control module 1910 may also be connected to one or more cache(s) 1916, which may store cache records 1918. The control module 1910 may represent the cache module 510, the search module 310, or the advertising module 410 of FIG. 2. The memory 1920 stores search records 1930, configuration data 1932, templates 1933, advertising records 1934, user records 1936, and card records 1938, which may match corresponding data, information, cards, and/or records stored in the memory 1880 of the user device 200 of FIG. 18. The network interface 1904 includes a PHY module 1906 and a MAC module 1908. The PHY module 1906 communicates with the networks, network devices, user devices, and/or servers disclosed herein.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more operations within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A method of operating a geo-fence pre-caching system, wherein the geo-fence pre-caching system comprises a cache server, the method comprising:
    receiving, at the cache server, a query wrapper comprising a cache identifier and a location of a user device, wherein the cache server is implemented in a cloud-based network, and wherein the query wrapper is received from the user device;
    selecting, by the cache server, a first cache of a plurality of caches included in the cache server based on the cache identifier;
    mapping, by the cache server, the location of the user device to a first geographical area;
    accessing, by the cache server, a first cache entry of a first cache record based on the first geographical area, wherein the first cache entry indicates the first geographical area;
    based on content of the first cache entry, accessing, by the cache server, one or more cache entries in the first cache corresponding to one or more geographical areas adjacent to the first geographical area, wherein the one or more cache entries do not include the first cache entry, and wherein the content of the first cache entry links to the one or more cache entries;
    retrieving, by the cache server, content included in the one or more cache entries;
    formatting, by the cache server, the content included in the one or more cache entries for presentation at the user device; and
    transmitting the formatted content from the cache server to the user device,
    wherein the content included in the one or more cache entries corresponds to the content of the first cache entry, and
    wherein the content of the first cache entry is formatted with local content that is obtained from a content provider and includes one or more local entities within a certain distance of the location of the user device.

2. The method of claim 1, further comprising:
    determining whether an amount of time since a last update of the first cache record at the cache server is greater than a predetermined amount of time;
    in response to the amount of time being less than the predetermined amount of time, refraining from accessing a service provider server and updating the content of the first cache record; and
    in response to the amount of time being greater than or equal to the predetermined amount of time, (i) generating a content request, (ii) transmitting the content request to the service provider server, and (iii) receiving updated data for the first cache record.

3. The method of claim 1, further comprising:
    determining whether to update content of the first cache;
    transmitting a content request to a service provider server; and
    receiving cache results for one or more cache entries corresponding to the first geographical area from the service provider server.

4. The method of claim 1, further comprising:
    comparing content of the first cache record to contents of cache records corresponding to the one or more geographical areas adjacent to the first geographical area; and
    in response to a content match existing between the content of the first cache record and content of one of the cache records corresponding to one of the one or more geographical areas adjacent to the first geographical area, replacing the content of the one of the cache records corresponding to the one of the one or more geographical areas adjacent to the first geographical area with the content of the first cache record or a link to the first cache record.

5. The method of claim 4, further comprising, in response to a content match not existing between the content of the first cache record and the content of the one of the cache records corresponding to the one of the one or more geographical areas adjacent to the first geographical area, determining whether to compare another cache record.

6. The method of claim 5, further comprising, in response to determining that another cache record is to be compared, selecting a second cache record to compare.

7. The method of claim 6, further comprising:
    determining whether the second cache record is in the first cache or a second cache;
    in response to the second cache record being in the second cache, accessing content of the second cache record in the second cache;
    comparing the content of the one or more cache records to content of the second cache record; and
    in response to a content match existing between the content of the one or more cache records and the content of the second cache record, replacing the content of the second cache record with a link to the first cache record or a link to the one or more cache records.

8. The method of claim 1, further comprising dividing the first geographical area into sub-areas and dividing the first cache into portions corresponding respectively to the sub-areas, wherein the portions respectively have a plurality of cache records.

9. The method of claim 8, further comprising linking two or more of the portions, including modifying one or more of the portions to include a respective link.

* * * * *